United States Patent
Nishioka et al.

(10) Patent No.: US 8,508,429 B2
(45) Date of Patent: Aug. 13, 2013

(54) RADIO COMMUNICATION EQUIPMENT

(75) Inventors: Yasuhiro Nishioka, Tokyo (JP); Toru Fukasawa, Tokyo (JP); Hiroaki Miyashita, Tokyo (JP); Tomohiro Mizuno, Tokyo (JP); Takuro Sasaki, Tokyo (JP); Hirokatsu Okegawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 371 days.

(21) Appl. No.: 12/996,880

(22) PCT Filed: Jun. 26, 2009

(86) PCT No.: PCT/JP2009/061775
§ 371 (c)(1),
(2), (4) Date: Dec. 8, 2010

(87) PCT Pub. No.: WO2010/001837
PCT Pub. Date: Jan. 7, 2010

(65) Prior Publication Data
US 2011/0084888 A1   Apr. 14, 2011

(30) Foreign Application Priority Data
Jul. 2, 2008  (WO) .................. PCT/JP2008/061988

(51) Int. Cl.
*H01Q 1/36* (2006.01)
*G06K 19/07* (2006.01)

(52) U.S. Cl.
USPC .......................... 343/895; 340/572.7; 235/492

(58) Field of Classification Search
USPC ....... 343/700 MS, 702, 728, 895; 340/572.1, 340/572.7; 235/492
See application file for complete search history.

(56) References Cited

U.S. PATENT DOCUMENTS
5,999,409 A * 12/1999 Ando et al. ................... 361/737
7,439,933 B2   10/2008 Uesaka
(Continued)

FOREIGN PATENT DOCUMENTS
CN   1391390 A    1/2003
CN   101082960 A   12/2007
(Continued)

OTHER PUBLICATIONS
U.S. Appl. No. 13/265,049, filed Oct. 18, 2011, Nishioka, et al.
(Continued)

*Primary Examiner* — Tan Ho
(74) *Attorney, Agent, or Firm* — Oblon, Spivak, McClelland, Maier & Neustadt, L.L.P.

(57) ABSTRACT

A radio communication device is obtained which is provided with an RFID tag function which can ensure the mounting area of each antenna as large as possible, and which is sharable with an LF band RFID system or an HF band RFID system and a UHF band RFID system, while having a communication range equivalent to the communication range of each of an LF band an HF band and a UHF band.

The device is provided with an integrated circuit (4) having a communication function in a first frequency band, a conductive object (3) connected to one of input and output terminals of the integrated circuit (4), an integrated circuit (5) having a communication function in a second frequency band, and a second conductive object connected between input and output terminals of the integrated circuit (5). The second conductive object is composed of a spiral conductive object (2). The other of the input output terminals of the integrated circuit (4) is connected to a part of the spirally wound conductive object (2).

22 Claims, 42 Drawing Sheets

(56) References Cited

U.S. PATENT DOCUMENTS

| | | | |
|---|---|---|---|
| 7,545,276 B2 * | 6/2009 | Shionoiri et al. | 340/572.1 |
| 7,954,722 B2 * | 6/2011 | Sakama | 235/492 |
| 2006/0232419 A1 | 10/2006 | Tomioka et al. | |
| 2007/0063057 A1 | 3/2007 | Masubuchi et al. | |
| 2007/0090955 A1 | 4/2007 | Cote et al. | |
| 2007/0290928 A1 | 12/2007 | Chang et al. | |
| 2008/0246664 A1 | 10/2008 | Ikemoto et al. | |

FOREIGN PATENT DOCUMENTS

| | | |
|---|---|---|
| JP | 2004-213582 | 7/2004 |
| JP | 2004 240899 | 8/2004 |
| JP | 2004-280465 | 10/2004 |
| JP | 2005 190119 | 7/2005 |
| JP | 2005 252853 | 9/2005 |
| JP | 2006 295729 | 10/2006 |
| JP | 2006 309476 | 11/2006 |
| JP | 2007 86863 | 4/2007 |
| JP | 2007 150642 | 6/2007 |
| JP | 2007 312350 | 11/2007 |
| JP | 2009 71413 | 4/2009 |
| WO | 2008 126451 | 10/2008 |

OTHER PUBLICATIONS

International Search Report issued Oct. 6, 2009 in PCT/JP09/61775 filed Jun. 26, 2009.

Leong, Seong Kin et al., "Miniaturization of Dual Frequency RFID Antenna with High Frequency Ratio", 2007 IEEE Antennas and Propagation Society International Symposium Digest, pp. 5475-5478, (Jul. 2007).

Chinese Office Action issued Jan. 25, 2013, in China patent Application No. 200980125900.6 (with English Translation).

* cited by examiner

RADIO COMMUNICATION EQUIPMENT

TECHNICAL FIELD

The present invention relates to a radio communication device provided with an antenna configuration of a tag used in an RFID (Radio Frequency Identification) system, and in particular, to a multi-frequency sharable radio communication device.

BACKGROUND ART

In recent years, RFID systems for recognizing and managing people and goods in an automatic manner are becoming widespread rapidly.

An electromagnetic field emitted from an antenna used for RFID systems has three fields, i.e., a quasi electrostatic field, an induction field, and a radiation field, and the strengths of these fields are in inverse proportion to the cube of the distance from the antenna, the square of the distance from the antenna, and the first power of the distance from the antenna, respectively.

When the communication methods of RFID systems are classified from this point of view, they will be divided roughly into an induction field coupling system using an induction field in LF band or HF band, and a radiation field coupling system using a radiation field in UHF band.

As for the former one, i.e., the induction field coupling system, RFID systems making use of a band of 125 kHz through 135 kHz of the LF band are used in the FA (Factory Automation) field of factories, etc., around from the 1980s. In addition, RFID systems using a 13.56 MHz band of the HF band are widely used for security management for entering or leaving a room, security management of entrance and exit, fare payment in public transportation facilities such as buses, railroads, etc.

On the other hand, the latter one, i.e., the radiation field coupling system, uses frequencies of 433 MHz band, 860 MHz to 960 MHz band, and 2.45 GHz band, has a long communication range as compared with the former, and is mainly being put into practical use for purposes such as physical distribution management, parts management in production plants, etc.

However, at present, the former induction field coupling system, in particular an HF band RFID system, is most widely prevalent.

In such a situation, there is a demand that users want to hold an existing HF band RFID system as it is, and in addition thereto, to newly introduce a UHF band RFID system. In this case, considering users' convenience, it is not desirable that the users each own a plurality of tags for use with the individual RFID systems, respectively, but it is instead desirable that the users can cope with the plurality of RFID systems by the use of only one tag.

From such a background, in recent years, there have been made the research and development of the card-type RFID tags which are available on both of the HF band RFID system and the UHF band RFID system. As an example, there has been proposed a method of forming a UHF band communication dipole antenna at the inner side of an HF band communication coil conductor which is formed on a card (for example, see a first patent document and a first nonpatent document).

That is, as a method of arranging the HF band communication coil and the UHF band communication antenna in one sheet of card, there are roughly two methods of arrangements, i.e., one method of arranging a UHF band antenna at the inner side of an HF band coil as described in the first patent document and the first nonpatent document, and the other method which is different from this and in which a UHF band antenna is arranged at the outer side of an HF band coil.

[Prior Art References]
[Patent Documents]
[First Patent Document] Japanese patent application laid-open No. 2004-240899
[Nonpatent Documents]
[First Nonpatent Document]
K. S. Leong, M. L. Ng, and P. H. Cole, "Miniaturization of dual frequency RFID antenna with high frequency ratio" 2007 IEEE Antennas and Propagation Society International Symposium Digest, pp. 5475-5478, July 2007

SUMMARY OF THE INVENTION

Problems to be Solved by the Invention

In the conventional radio communication devices, as for the method of arranging the UHF band antenna at the inner side of the HF band coil, as in the first patent document and the first nonpatent document, it is described in the first nonpatent document that the communication range of a tag in the UHF band is about 2 m, and for example, in cases where it is considered that this tag is used for management of the entrance and exit of vehicles, such a communication range is not necessarily sufficient and an improvement in the communication range is required, but there has been a problem that it is not easy to achieve a sufficient communication range at the time of practical use.

On the other hand, in the method of arranging the UHF band antenna at the inner side of the HF band coil, as in the other conventional technique, it is necessary to make the mounting area of the HF band coil small in order to arrange the UHF band antenna, but roughly speaking, the communication range of the HF band is proportional to the area of the coil, so there has been a problem that making the mounting area of the HF band coil small results in a reduction in the communication range of the HF band.

Further, in any of the two arrangement methods, mutual interference between the HF band coil and the UHF band antenna occurs, so in order to decrease the reduction in the communication range due to the mutual interference, it is required that both of the antenna conductors should be apart in distance from each other to some extent, as a result of which there has been a problem that the mounting area of each antenna might be further decreased, thus giving rise to a possibility that the communication range might be reduced.

The present invention is made in order to solve the problems as referred to above, and has for its object to obtain a radio communication device provided with an RFID tag function which can ensure the mounting area of each antenna as large as possible, and which is sharable with an LF band RFID system or an HF band RFID system and a UHF band RFID system, while having a communication range equivalent to the communication range of each single unit of an LF band or an HF band and a UHF band.

Means for Solving the Problems

A radio communication device according to this invention resides in a radio communication device which is composed of an antenna which performs communication corresponding to individual signals in at least two high and low frequency bands including a first frequency band and a second frequency band which is sufficiently low as compared with the first frequency band, the radio communication device comprising a first integrated circuit that has a communication function in a first frequency band, a first conductive object that is connected to one of input and output terminals of the first integrated circuit, a second integrated circuit that has a communication function in a second frequency band, and a second conductive object that is connected between input and output terminals of the second integrated circuit, wherein the second conductive object is composed of a spirally wound conductive object, and the other of the input and output terminals of the first integrated circuit is connected to a part of the spirally wound conductive object.

Effect of the Invention

According to the present invention, it is possible to obtain a radio communication device provided with an RFID tag function which can ensure the mounting area of each antenna as large as possible, and which is sharable with an LF band RFID system or an HF band RFID system and a UHF band RFID system, while having a communication range equivalent to the communication range of each single unit of an LF band an HF band and a UHF band.

BEST MODES FOR CARRYING OUT THE INVENTION (First Embodiment)

Hereinafter, preferred embodiments of a radio communication device according to this invention will be explained while referring to the accompanying drawings.

Figure 1:
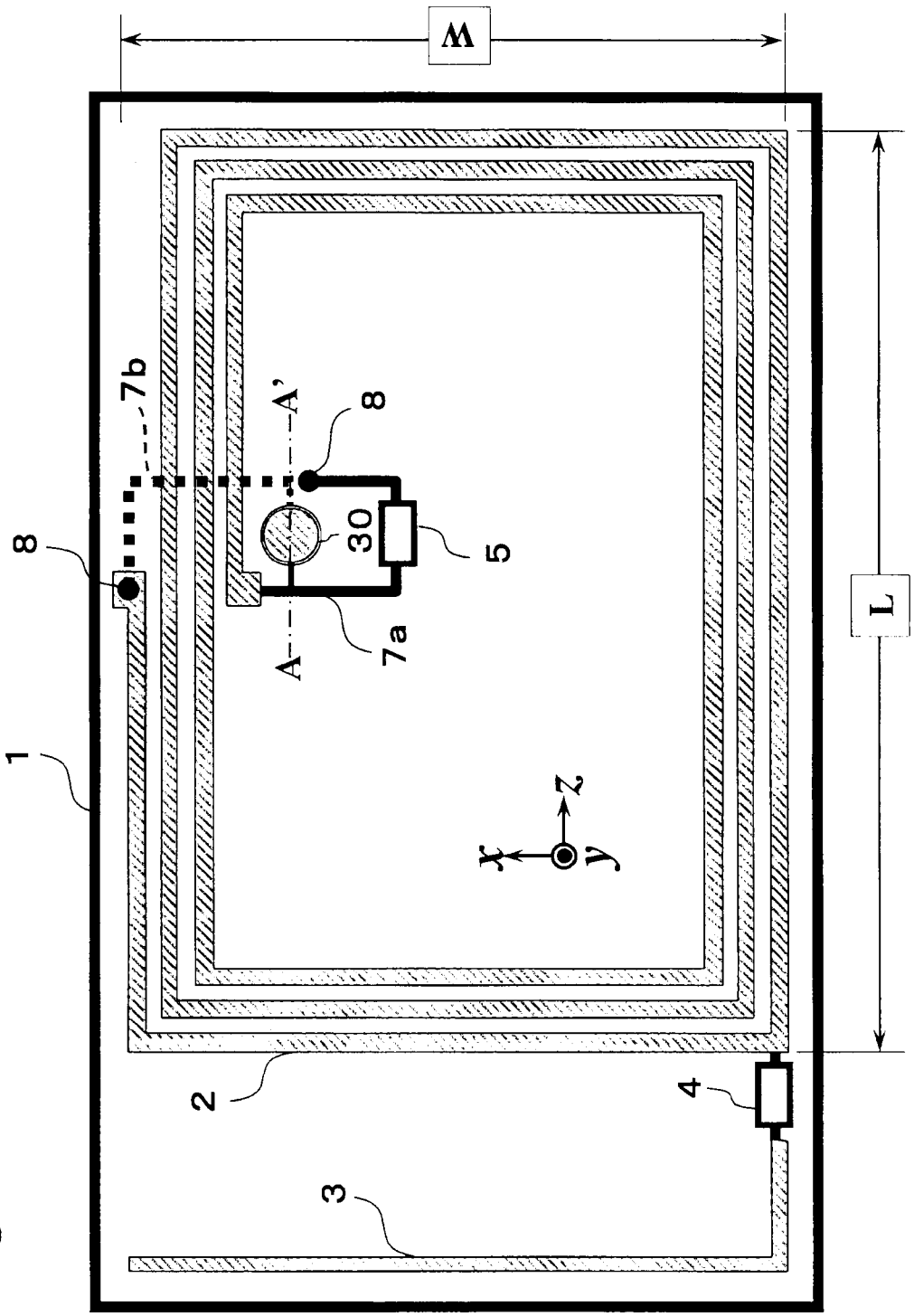
[FIG. 1] is a plan view showing a first configuration example of a radio communication device according to a first embodiment of this invention. (First Embodiment)
Figure 2:
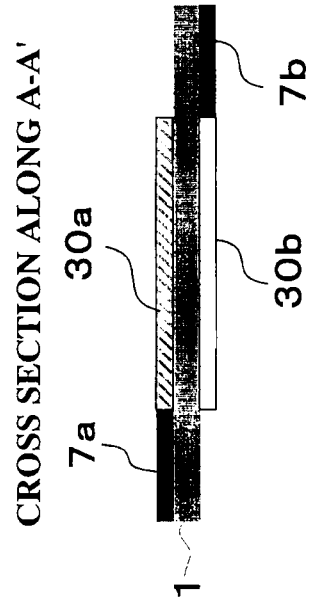
[FIG. 2] is a cross sectional view along line A-A' in FIG. 1. (First Embodiment)

FIG. 1 is a plan view showing a radio communication device according to a first embodiment of this invention, and FIG. 2 is a cross sectional view along line A-A' in FIG. 1.

In FIG. 1, a radio communication device is provided with a plate-like object 1, a spirally wound conductive object 2 which has outside dimensions L, W, a conductive object 3 of an L shape (an extended shape), integrated circuits 4, 5, conductive objects 7a, 7b, different layer connection parts 8 such as through holes, and a parallel plate capacitor 30 composed of a pair of plates 30a, 30b (see FIG. 2). One (i.e., upper surface side) plate 30a of the parallel plate capacitor 30 is made conductive to the conductive object 7a, and the other (i.e., lower surface side) plate 30b of the parallel plate capacitor 30 is made conductive to the conductive object 7b.

The plate-like object 1 is made of an arbitrary substance. The integrated circuit 4 is provided with a function required for communication in a first frequency band, and the integrated circuit 5 is provided with a function required for communication in a second frequency band. The conductive objects 7a, 7b serve to connect the spirally wound conductive object 2 and the input and output terminals of the integrated circuit 5 with each other. The different layer connection parts 8 serve to connect arbitrary conductive objects formed on the front surface of the plate-like object 1 and arbitrary conductive objects formed on the back surface of the plate-like object 1 to each other.

The parallel plate capacitor 30 is electrically connected in parallel to the integrated circuit 5. The capacitance value of the parallel plate capacitor 30 is usually designed in such a manner that the parallel plate capacitor 30 cooperates with the spirally wound conductive object 2 to form an LC parallel resonant circuit so as to resonate in a desired frequency of the second frequency band. Alternatively, the capacitance value of the parallel plate capacitor 30 is designed so that in the desired frequency of the second frequency band, impedance matching between a circuit formed by the spirally wound conductive object 2 and the integrated circuit 5 becomes good. Accordingly, in cases where the first frequency band is large enough as compared with the second frequency band, the parallel plate capacitor 30 becomes in many cases a substantially electrically short circuited structure in the first frequency band.

The electric length of the conductive object 3 may be arbitrary as long as good communication performance cab be obtained in the first frequency band, but it is often selected to be about an effective wavelength of 1 $\lambda_{1e}$ or less of the first frequency band. Here, the effective wavelength of $\lambda_{1e}$ of the first frequency band is a value in consideration of the electrical influence of objects arranged around the conductive object 3, such as the plate-like object 1 and other surrounding objects (not shown). In addition, although the conductive object 3 is here illustrated as a thin line, any arbitrary shape such as an elliptical shape, a polygonal shape, etc., may be used.

The configuration of FIG. 1 with the integrated circuit 4 and the conductive object 3 being removed therefrom is the most fundamental well-known configuration of contactless IC cards which are widely prevalent in the present day.

The standing wave current distribution on the conductive object 3 is determined by a boundary condition that the amplitude of current at a tip of the conductive object 3 is zero.

Accordingly, the desired frequency of the first frequency band is large enough as compared with the desired frequency of the second frequency band, that is, an effective wavelength $\lambda_{2e}$ of the second frequency band is long enough as compared with the effective wavelength $\lambda_{1e}$ of the first frequency band, a current in the second frequency band hardly flows on the conductive object 3.

As a result, even if the integrated circuit 4 and the conductive object 3 are connected to an arbitrary position of the spirally wound conductive object 2, the characteristic of communication in the second frequency band carried out with external instrument is hardly affected by the integrated circuit 5, the parallel plate capacitor 30 and the spirally wound conductive object 2.

On the other hand, in cases where an antenna operation in the first frequency band is considered, the input and output terminal parts of the integrated circuit 4 correspond to a so-called electric power supply part, and a current flows through the whole of the conductive object 3 and the spirally wound conductive object 2, so that the conductive object 3 and the spirally wound conductive object 2 operate as an antenna.

At this time, in the first frequency band, the parallel plate capacitor 30 often becomes a substantially electrically short circuited configuration, as mentioned above, so such an antenna operation in the first frequency band becomes unrelated to the input impedance of the integrated circuit 5.

In cases where the parallel plate capacitor 30 is not required in order to perform good communication in the second frequency band, it is basically desirable to determine the electrostatic capacitance value of the parallel plate capacitor 30 in such a manner that the input and output terminal parts of the integrated circuit 5 are put into a substantially electrically short circuited state in the first frequency band, and are put into a substantially electrically open state in the second frequency band.

Figure 3:
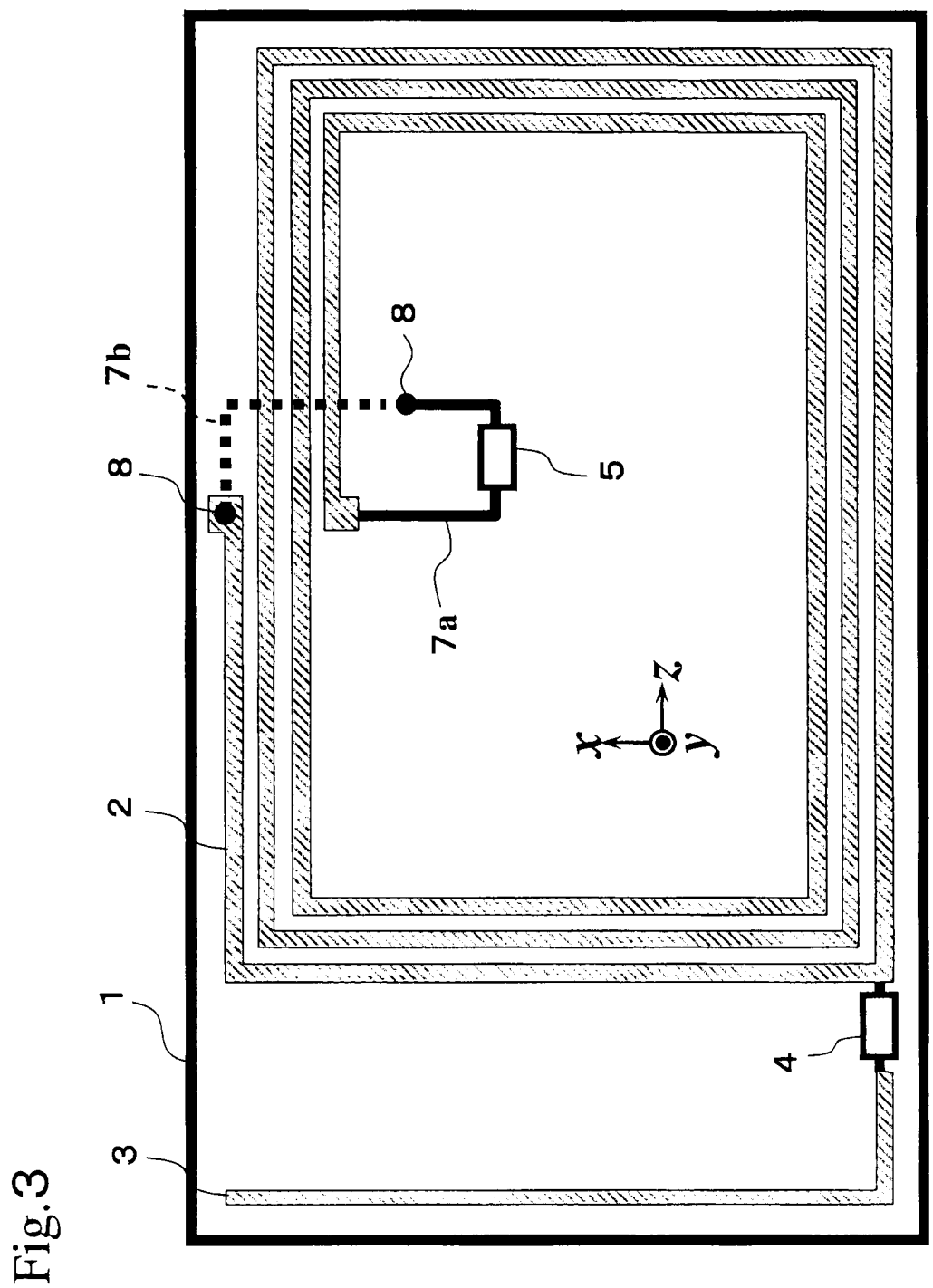
[FIG. 3] is a plan view showing the configuration example with a parallel plate capacitor in FIG. 1 being omitted. (First Embodiment)

However, in cases where it is determined, as a result of an electromagnetic field analysis or an experiment, that the capacitor 30 is unnecessary in the first frequency band, too, the capacitor 30 can be removed, as shown in FIG. 3.

In other words, the characteristic of the antenna is greatly dependent on the size and the number of turns of the spirally wound conductive object, as wall as the characteristic of mediums in the vicinity of the antenna, so the capacitor 30 may be removable depending upon these physical condition and electric condition as well as the communication range required, and hence, in the present invention, the capacitor 30 is not necessarily an indispensable component. Although in the following, description will be made by taking, as an example, a case where the capacitor is connected between the input and output terminals of the integrated circuit 5, the capacitor may be able to be removed, as mentioned above.

In general, assuming that the electrostatic capacitance value of a capacitor is set to C and the frequency of an AC power supply is set to f, the impedance value Z of the capacitor is given by the following equation (1), as will be well known.

$$Z = -j/(2\pi f C) \quad (1)$$

As will be clear from equation (1) above, the ratio of the impedance value Z of the capacitor is the reciprocal of the ratio of the frequency f.

Here, let us assume that a first center frequency in the first frequency band is $f_1$, a second center frequency in the second frequency band is $f_2$, an impedance value at the first center frequency $f_1$ is $Z_1$, and an impedance value at the second center frequency $f_2$ is $Z_2$. In this case, when a condition of $f_1 \gg f_2$ is satisfied, the following equation (2) holds.

$$|Z_1| \ll |Z_2| \quad (2)$$

Therefore, by selecting the electrostatic capacitance value C in an appropriate manner, the input and output terminal parts of the integrated circuit 5 can be made substantially electrically short circuited at the first center frequency $f_1$, and can be made substantially electrically open at the second center frequency $f_2$.

For example, if the first and second center frequencies $f_1$, $f_2$ are as follows;
$f_1$=2.45 [GHz], and
$f_2$=13.56 [MHz],
a center frequency ratio $f_1/f_2$ will be given by the following equation (3).

$$f_1/f_2 \approx \text{(approximately) } 181 \quad (3)$$

In addition, if the first and second center frequencies $f_1$, $f_2$ are as follows;
$f_1$=960 [MHz], and
$f_2$=13.56 [MHz],
the center frequency ratio $f_1/f_2$ will be given by the following equation (4).

$$f_1/f_2 \approx \text{(approximately) } 71 \quad (4)$$

Further, if the first and second center frequencies $f_1$, $f_2$ are as follows;
$f_1$=860 [MHz], and
$f_2$=13.56 [MHz],
the center frequency ratio $f_1/f_2$ will be given by the following equation (5).

$$f_1/f_2 \approx \text{(approximately) } 63 \quad (5)$$

Here, note that in the above-mentioned conditions, the second center frequency $f_2$ is set to 13.56 [MHz], but if $f_2$=135 [kHz], for example, the center frequency ratio $f_1/f_2$ may be 100 times of the values in equations (3) through (5), respectively.

For example, in cases where the impedance value $Z_1$ at the first center frequency $f_1$ is set to 0-j36 [Ω] with $f_1$=860 MHz and $f_2$=13.56 MHz, because $f_1/f_2 \approx$(approximately) 63, as shown in equation (5), the impedance value $Z_2$ at the second center frequency $f_2$ becomes 0-j2268 [Ω].

Accordingly, the input and output terminal parts of the integrated circuit 5 is put into a substantially electrically short circuited state at the first center frequency $f_1$, and is put into a substantially electrically open state at the second center frequency $f_2$.

From the above considerations, by making use of the spirally wound conductive object 2 as a part of the antenna conductors for the first frequency band, as shown in FIG. 1, it becomes possible to obtain the mounting areas of the individual antennas for the first and second frequency bands, respectively, more widely than in cases where an antenna for the first frequency band and an antenna for the second frequency band are arranged side by side.

Figure 4:
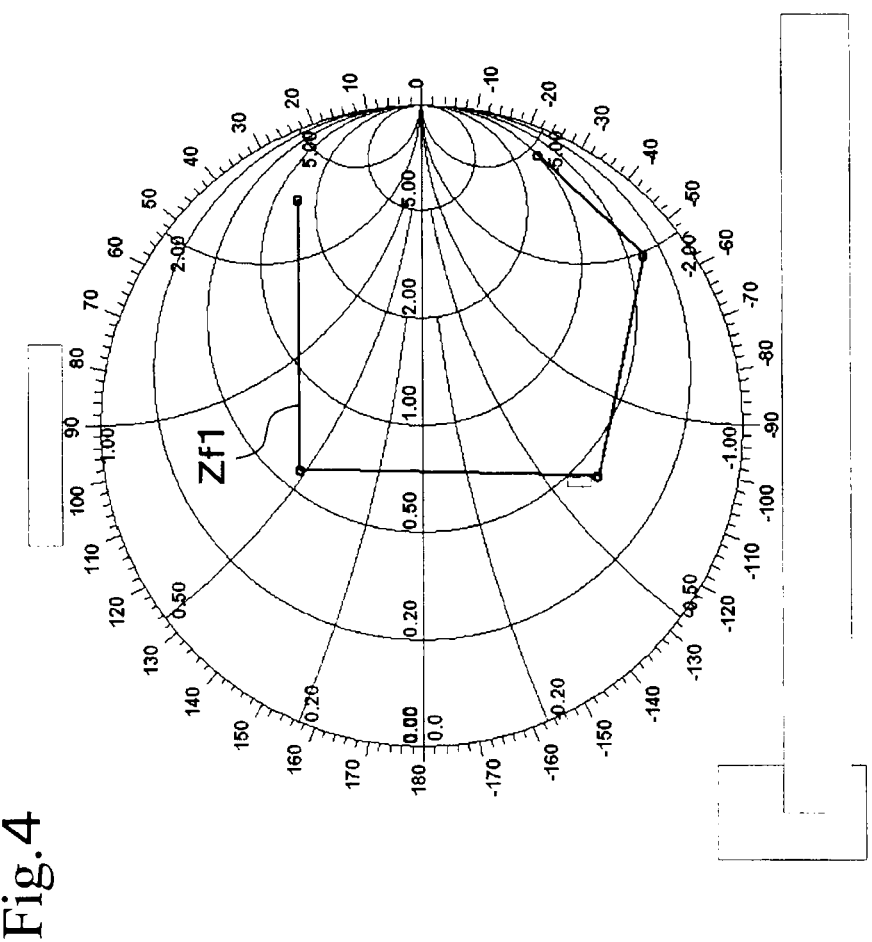
[FIG. 4] is a characteristic view showing an impedance frequency characteristic when looking at an antenna side from input and output terminals of an integrated circuit in FIG. 1. (First Embodiment)

As a result, with the configuration of FIG. 1, it becomes possible to obtain communication performance equivalent to a case where each antenna exists alone In order to verify the validity of the antenna configuration of FIG. 1, the inventors conducted a numerical electromagnetic field analysis and experiments, and obtained the result of FIG. 4.

FIG. 4 is a characteristic view showing an impedance frequency characteristic Zf1 when looking at an antenna side from the input and output terminals of the integrated circuit 4.

In FIG. 4, a numerical value inside each circle indicates a value which is obtained by normalizing the impedance Z by 50 [Ω], and shows the calculation result when the outside dimensions L, W in the z and y directions of the spirally wound conductive object 2 are set as L=0.19 $\lambda_1$ and W=0.14 $\lambda_1$, respectively on the basis of the wavelength in air $\lambda_1$ at the first center frequency $f_1$, and the width and length of the conductive object 3 are set to 0.0032 $\lambda_1$ and 0.254 $\lambda_1$, respectively.

In FIG. 4, the impedance frequency characteristic Zf1 is plotted in a Smith chart from 0.894 $f_1$ to 1.106 $f_1$ in increments of 0.053 $f_1$ over five points.

As is clear from the impedance frequency characteristic Zf1 of FIG. 4, it is found that in the case of the antenna configuration of FIG. 1, the amount of reactance change is large and in a narrow band as compared with a half-wavelength dipole antenna which is placed in a free space, but a similar impedance characteristic (series resonance characteristic) is shown.

Figure 5:
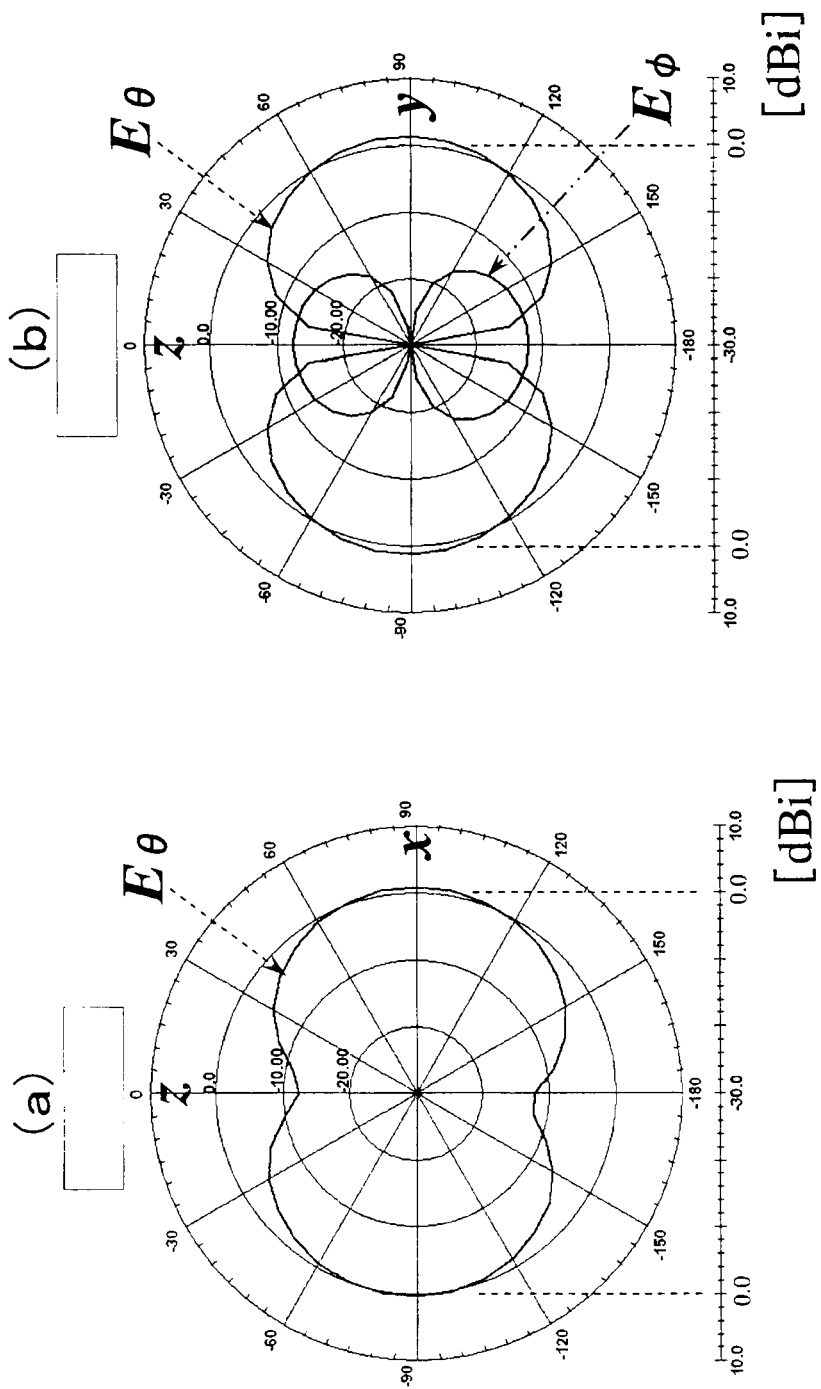
[FIG. 5] is explanatory views showing radiation pattern calculation results on an x-z plane and a y-z plane, respectively, in an antenna configuration of FIG. 1. (First Embodiment)

FIGS. 5(*a*), (*b*) are explanatory views showing radiation pattern calculation results on an x-z plane and a y-z plane, respectively, wherein a main polarization (an Eθ component) and a cross polarization (an Eφ component) are shown, respectively.

As is clear from FIG. 5, a radiation pattern similar to that in the half-wavelength dipole antenna is obtained by the antenna configuration of FIG. 1, and its radiation efficiency is −1.1 dB and its gain is 1.3 dBi.

Here, note that in FIG. 5(*b*), the cross polarization (Eφ component) occurs in the y-z plane, but is not at a level that causes a gain reduction in the main polarization (Eθ component), and there is no practical problem as a tag antenna.

In actuality, as a result of having made a trial model of and performed measurements on an antenna equivalent to the above-mentioned computation model, results corresponding well to the calculation results of FIG. 4 and FIG. 5 were obtained as an impedance frequency characteristic and a radiation pattern. In addition, the measured value of the radiation efficiency is −1.9 dB, and the validity of the antenna configuration of FIG. 1 has been verified.

Although in FIG. 1, the integrated circuit 5 and the parallel plate capacitor 30 are arranged at the inner side of the spirally wound conductive object 2, the arrangement of the integrated circuit 5 and the parallel plate capacitor 30 is not limited to being arranged at the inner side of the spirally wound conductive object 2.

Figure 6:
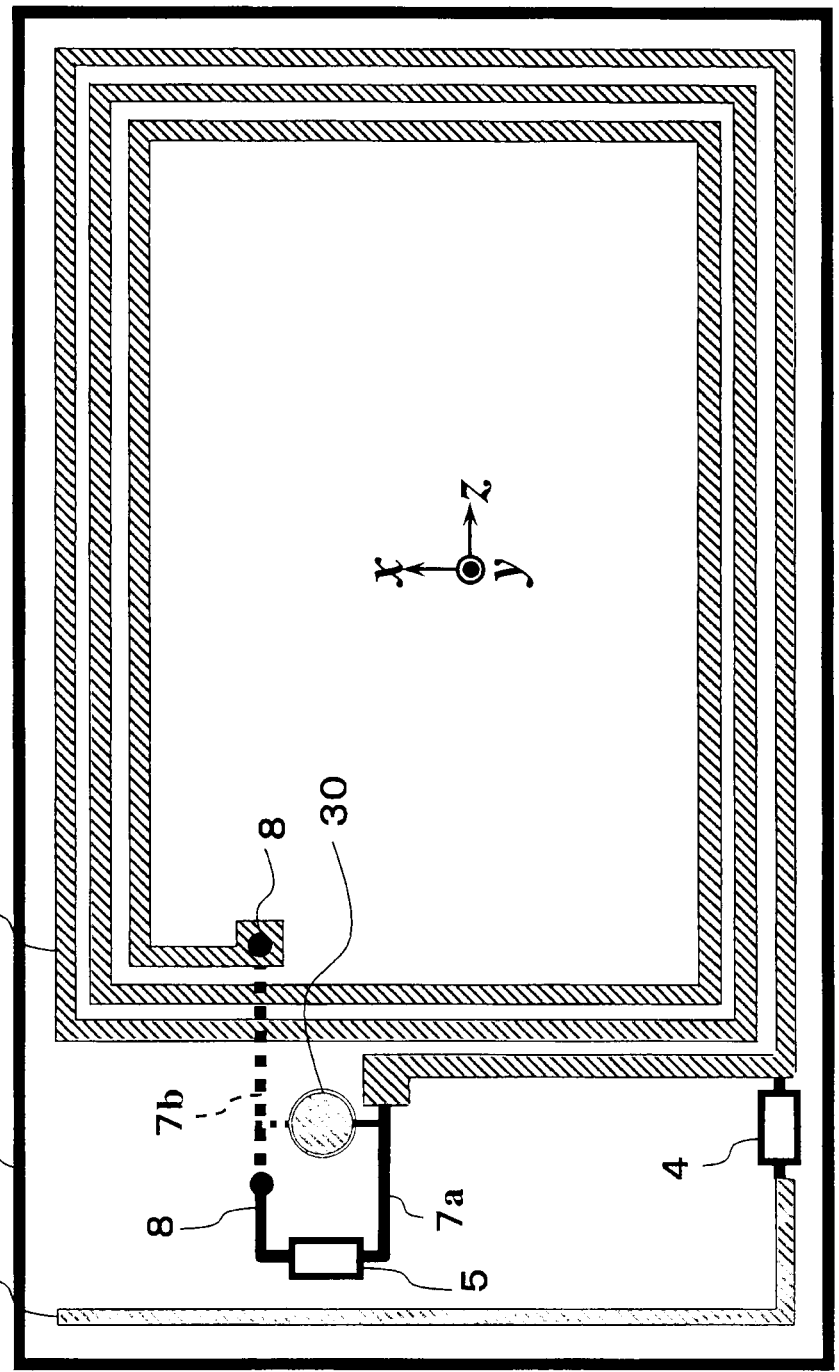
[FIG. 6] is a plan view showing a configuration example in which the integrated circuit and the parallel plate capacitor in FIG. 1 are arranged at the outer side of a spirally wound conductive object. (First Embodiment)
Figure 7:
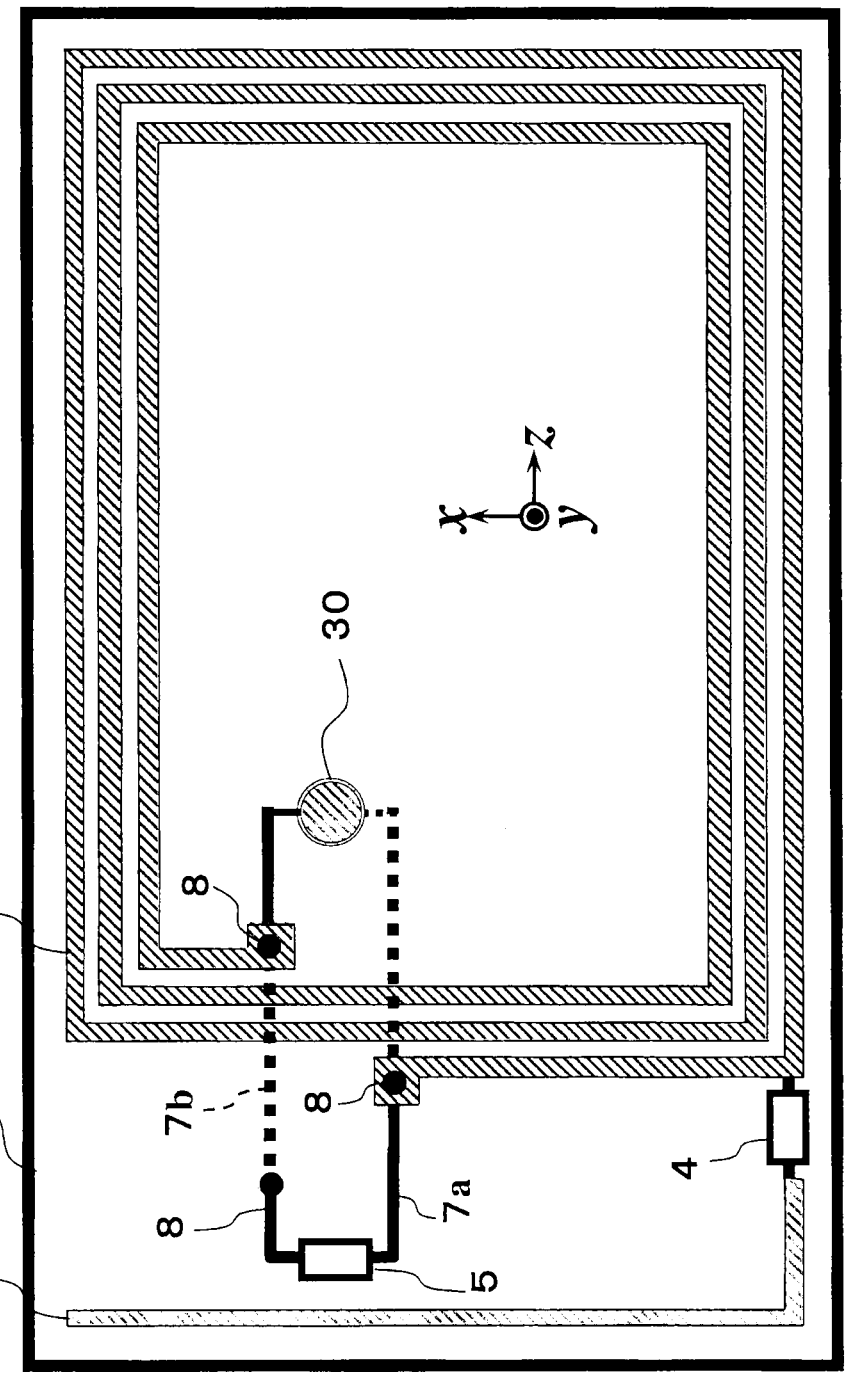
[FIG. 7] is a plan view showing a configuration example in which the integrated circuit in FIG. 1 is arranged at the outer side of the spirally wound conductive object. (First Embodiment)

That is, as shown in FIG. 6, both of them may be arranged at the outer side of the spirally wound conductive object 2, or as shown in FIG. 7, the integrated circuit 5 may be arranged at the outer side of the spirally wound conductive object 2, and the parallel plate capacitor 30 may be arranged at the inner side of the spirally wound conductive object 2. In addition, though not illustrated, the integrated circuit 5 may be arranged at the inner side of the spirally wound conductive object 2, and the parallel plate capacitor 30 may be arranged at the outer side of the spirally wound conductive object 2.

The arrangement of these components is designed in an appropriate manner in total consideration of the communication range performance in the first frequency band, the communication range performance in the second frequency band, the manufacturability (mounting) of the integrated circuit 5 by means of machinery, etc.

In the following, reference will be made, by way of example, to a case where the integrated circuit 5 and the parallel plate capacitor 30 are arranged at the inner side of the spirally wound conductive object 2, but even if these components are arranged at the outer side of the spirally wound conductive object 2, the operation of the antenna according to this invention is by no means spoiled theoretically.

Incidentally, in general, the impedance of the integrated circuit 4 used for an RFID tag is lower in resistance and has a high capacitive reactance. Accordingly, in the case of considering impedance matching between the antenna and the integrated circuit 4, an antenna impedance as shown in FIG. 4 may be inconvenient.

Figure 8:
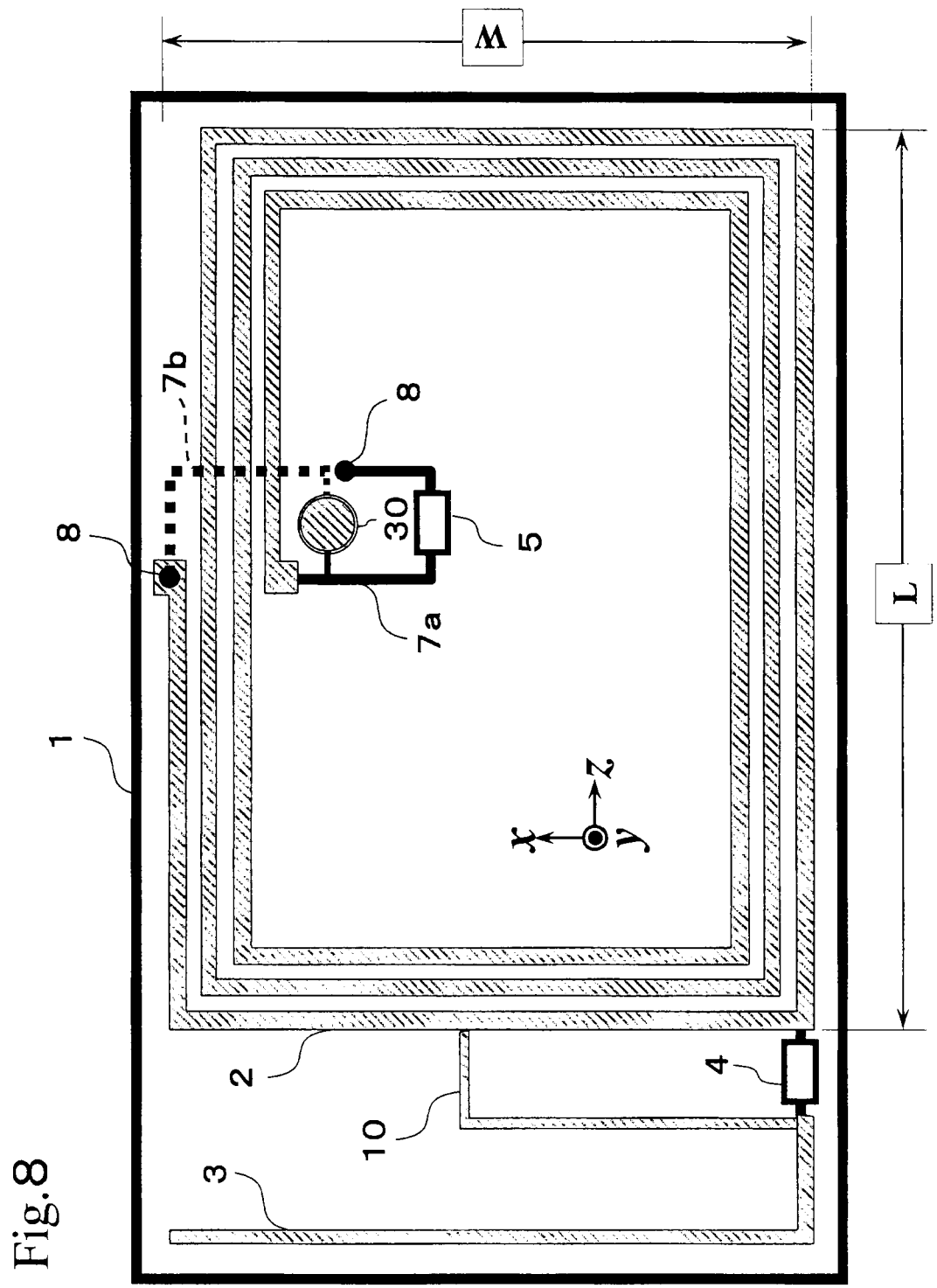
[FIG. 8] is a plan view showing a second configuration example of the radio communication device according to the first embodiment of this invention. (First Embodiment)

In order to cope with the above-mentioned inconvenient case, for example as shown in a plan view of FIG. 8, a so-called short stub may be formed by a conductive object 10 which is arranged on the plate-like object 1, wherein one end of the conductive object 10 is connected to the conductive object 3, and the other end of the conductive object 10 is connected to the spirally wound conductive object 2.

In FIG. 8, those which are similar to the aforementioned one (see FIG. 1) are denoted by the same reference numerals and characters as those in the aforementioned one, while omitting a detailed explanation thereof. In this case, the configuration is similar to the above-mentioned one (see FIG. 1) except for the addition of the conductive object 10.

Figure 9:
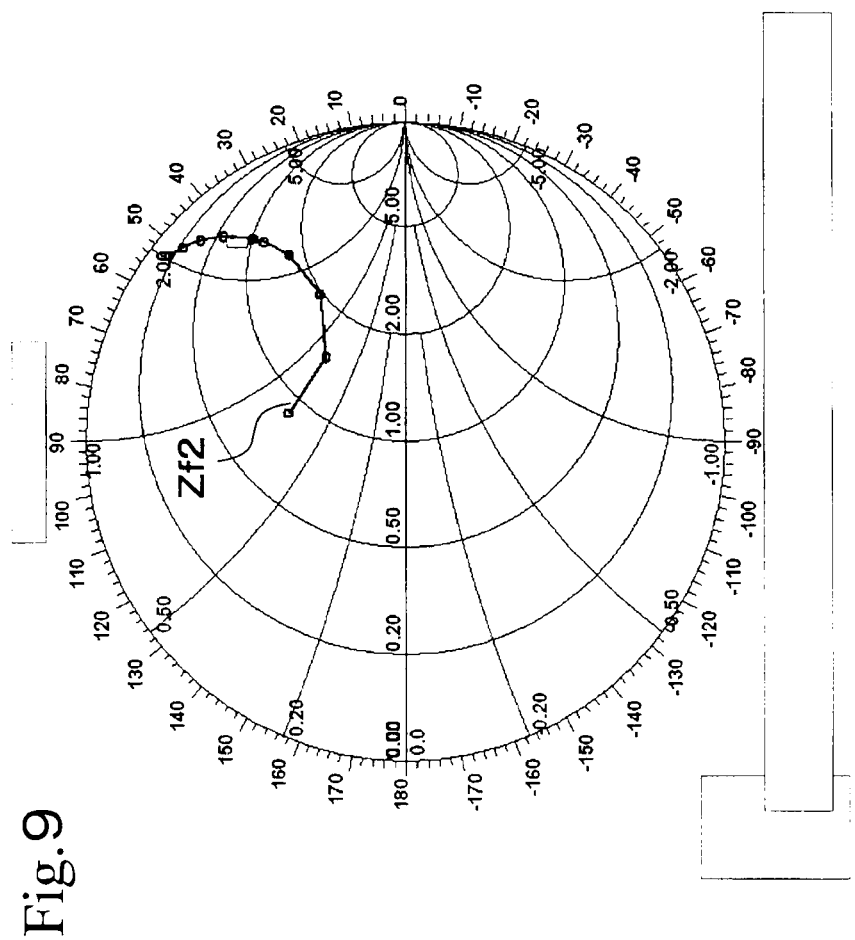
[FIG. 9] is a characteristic view showing an impedance frequency characteristic when looking at an antenna side from input and output terminals of an integrated circuit in FIG. 8. (First Embodiment)

According to the antenna configuration of FIG. 8, as shown by an impedance frequency characteristic Zf2 of FIG. 9, a desired band impedance can be displaced to near an impedance which is a complex conjugate relation to the impedance of the integrated circuit 4, so it becomes possible to obtain impedance matching between the antenna and the integrated circuit 4.

Here note that in FIG. 9, the plot frequency of the impedance frequency characteristic Zf2 is shown from 0.96 $f_1$ to 1.04 $f_1$ in increments of 0.001 $f_1$ over nine points.

Figure 10:
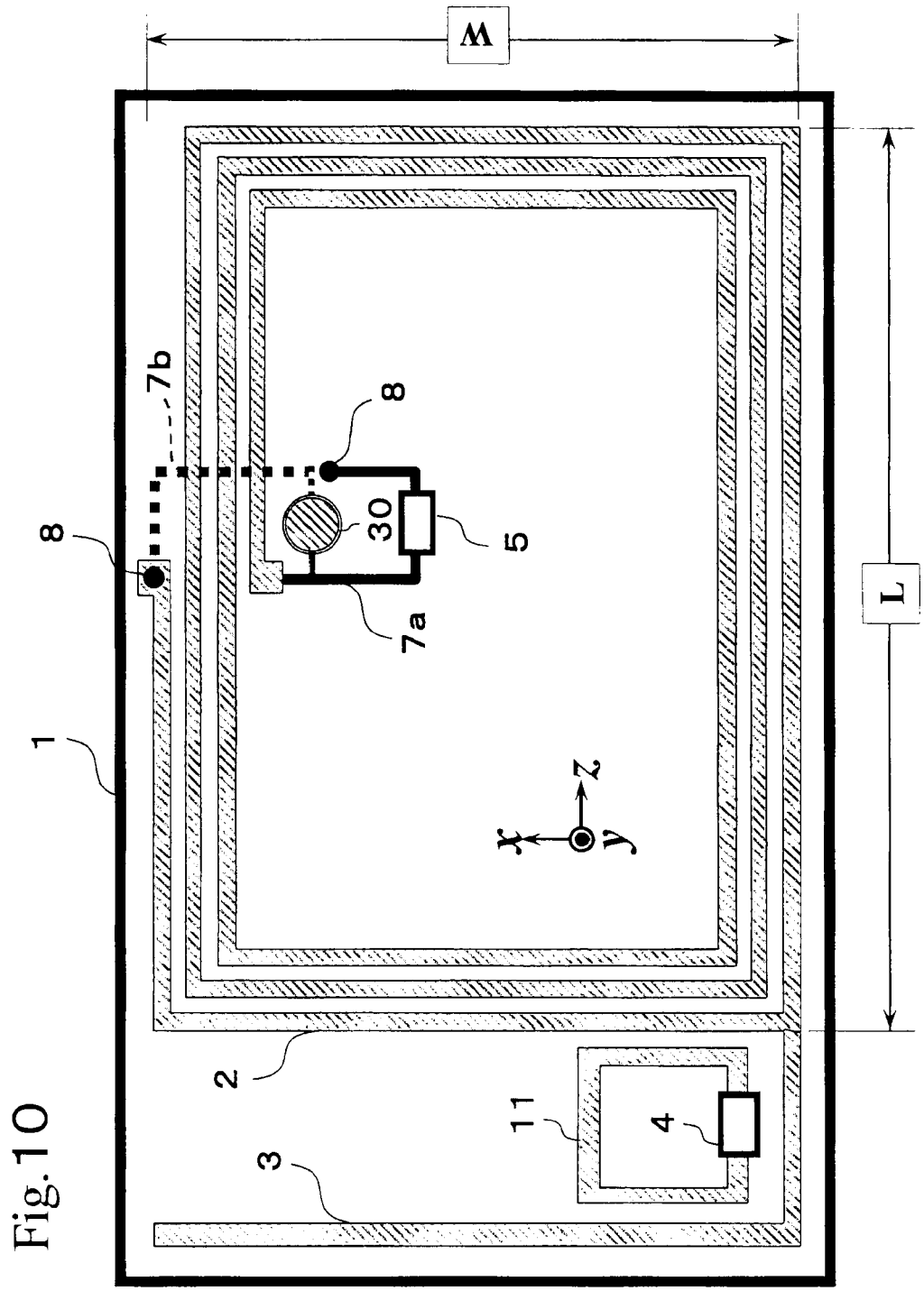
[FIG. 10] is a plan view showing a third configuration example of the radio communication device according to the first embodiment of this invention. (First Embodiment)

In addition, the impedance matching method is not limited to the short stub shown in FIG. 8, but as other means, for example as shown in a plan view of FIG. 10, there can be considered an antenna configuration in which a conductive object 11 of a closed loop shape is formed on the plate-like object 1, and the integrated circuit 4 is inserted in a part of the conductive object 11.

In FIG. 10, the integrated circuit 4 is isolated from the conductive object 3.

The conductive object 11 is arranged in the vicinity of the spirally wound conductive object 2 and/or the conductive object 3 (i.e., at least one of the spirally wound conductive object 2 and the conductive object 3), and one end of the conductive object 11 is connected to one terminal end of the integrated circuit 4, and the other end of the conductive object 11 is connected to the other terminal end of the integrated circuit 4. In addition, the conductive object 3 is connected to the spirally wound conductive object 2.

In the antenna configuration of FIG. 10, a magnetic field generated by a current flowing through the spirally wound conductive object 2 and the conductive object 3 passes through the space inside the loop of the conductive object 11, whereby a circuit comprising the integrated circuit 4 and the conductive object 11, and an antenna comprising the conductive object 3 and the spirally wound conductive object 2 are coupled with each other through the above-mentioned magnetic field.

Figure 11:
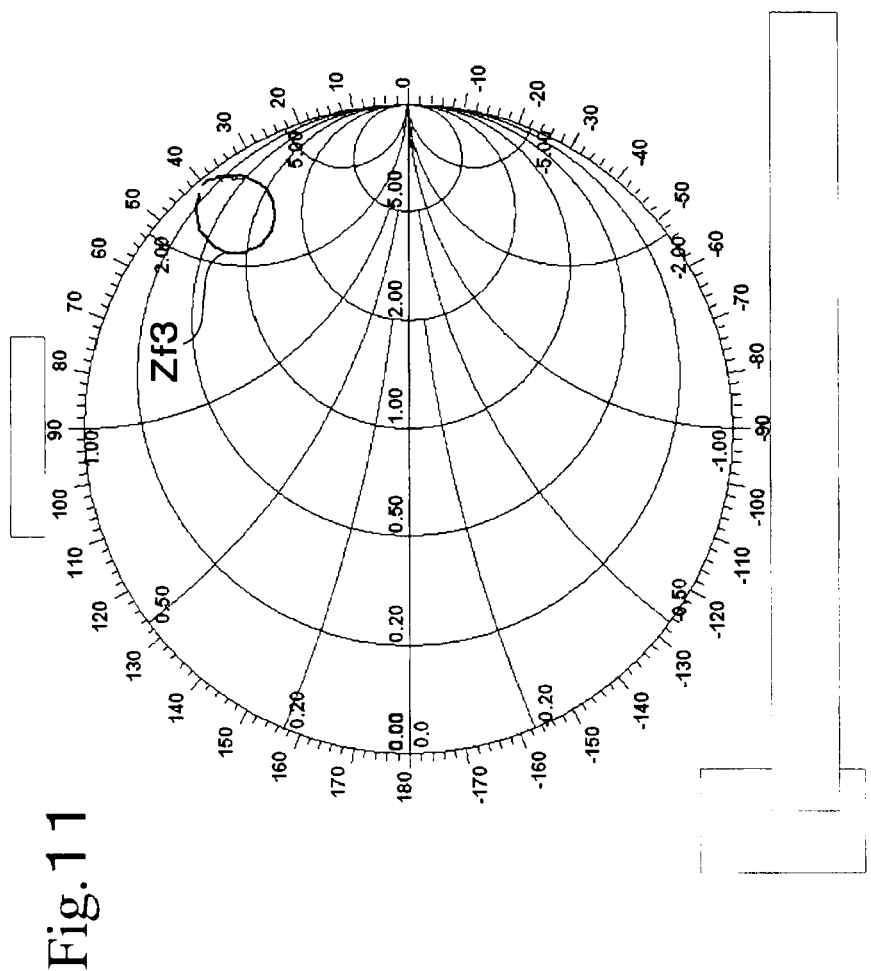
[FIG. 11] is an explanatory view showing the calculation result of an impedance frequency characteristic obtained according to an antenna configuration of FIG. 10. (First Embodiment)

FIG. 11 is an explanatory view showing the calculation result of an impedance frequency characteristic Zf3 obtained according to the antenna configuration of FIG. 10.

In FIG. 11, the plot frequency of the impedance frequency characteristic Zf3 is shown from 0.95 $f_1$ to 1.05 $f_1$ in increments of 0.005 $f_1$ over twenty one points.

As is clear from FIG. 11, by adopting the antenna configuration of FIG. 10, it is possible to obtain an antenna impedance characteristic suitable for obtaining impedance matching with the integrated circuit 4.

Here, note that the conductive object 11 may be in contact with the conductive object 3 and/or the spirally wound conductive object 2. This state is a limit or extreme state in which the distance of the conductive object 11 to the conductive object 3 and/or the spirally wound conductive object 2, is made zero, and it is considered that such a configuration operates as an antenna in the same manner as described above.

Figure 12:
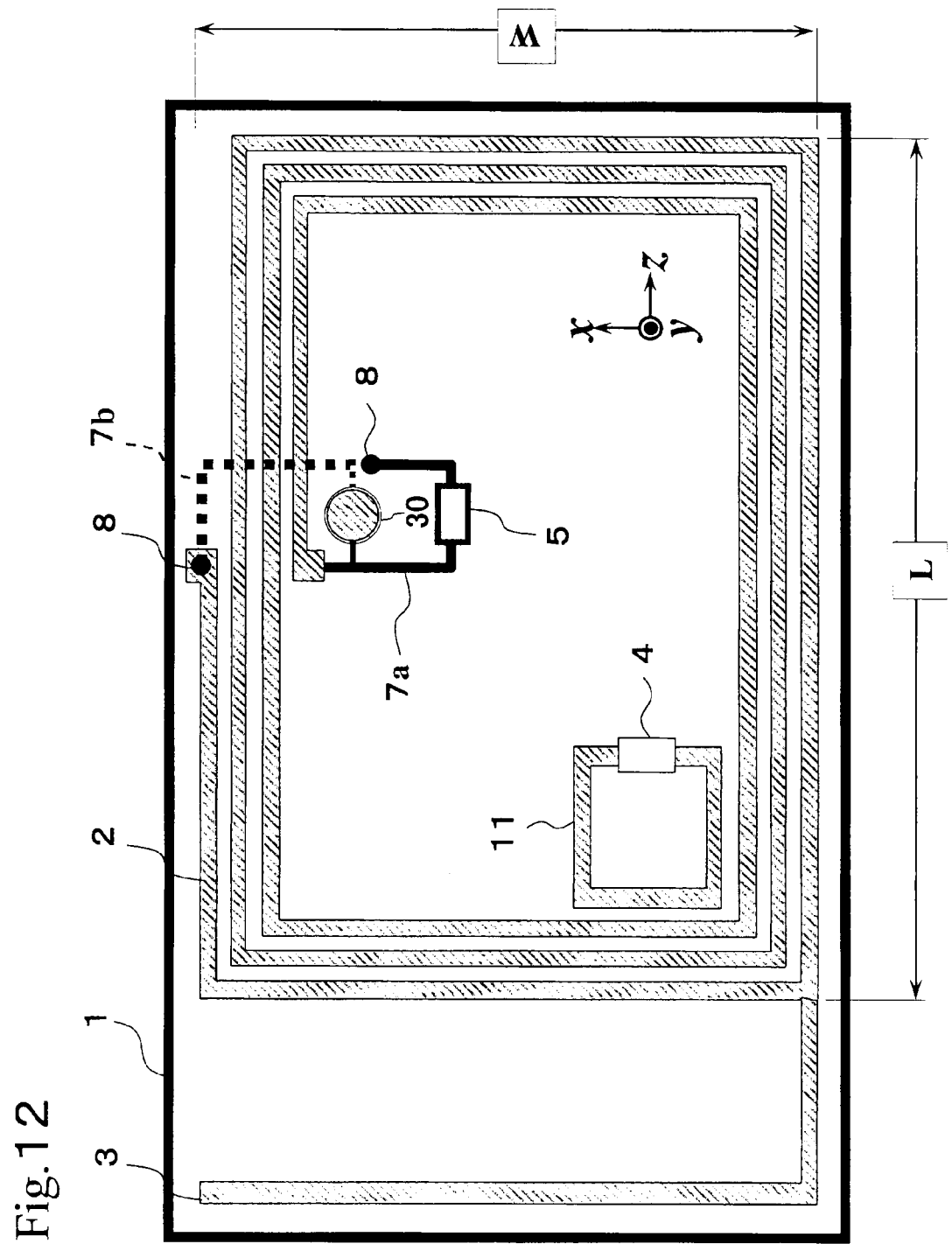
[FIG. 12] is a plan view showing a configuration example in which an integrated circuit and a conductive object in FIG. 10 are arranged at the inner side of a spirally wound conductive object. (First Embodiment)

Although in FIG. 10, the integrated circuit 4 and the conductive object 11 are arranged at the outer side of the spirally wound conductive object 2, the arrangement of the integrated circuit 4 and the conductive object 11 is not limited to such an arrangement of them at the outer side of the spirally wound conductive object 2, but as shown in FIG. 12, both of them may be arranged at the inner side of the spirally wound conductive object 2.

The arrangement of the integrated circuit 4 and the conductive object 11 is designed in an appropriate manner in total consideration of the communication range performance in the first frequency band, the communication range performance in the second frequency band, the manufacturability (mounting) of the integrated circuit 4 by means of machinery, etc.

In the following, reference will be made, by way of example, to a case where the integrated circuit 4 and the conductive object 11 are arranged at the outer side of the spirally wound conductive object 2, but even if these components are arranged at the inner side of the spirally wound conductive object 2, the operation of the antenna according to this invention is by no means spoiled theoretically.

As described above, the radio communication device according to the first embodiment of this invention is provided with, as shown in FIG. 1, the integrated circuit 4 (first integrated circuit) that has a communication function in the first frequency band, the conductive object 3 (first conductive object) that is connected to one of the input and output terminals of the integrated circuit 4, the integrated circuit 5 that has a communication function in the second frequency band, and the spirally wound conductive object 2 (second conductive object) that is connected between the input and output terminals of the integrated circuit 5, wherein the other of the input and output terminals of the integrated circuit 4 is connected to a part of the spirally wound conductive object 2.

In addition, as shown in FIG. 8, the device may be further provided with the conductive object 10 (third conductive object), and one end of the conductive object 10 is connected to the conductive object 3, and the other end of the conductive object 10 is connected to the spirally wound conductive object 2.

Further, as shown in FIG. 10, the device may be provided with the integrated circuit 4 that has a communication function in the first frequency band, the conductive object 3, the integrated circuit 5 that has a communication function in the second frequency band, the spirally wound conductive object 2 that is connected between the input and output terminals of the integrated circuit 5, and the conductive object 11 (third conductive object) of the closed loop shape that is connected between the input and output terminals of the integrated circuit 4, wherein one end of the conductive object 3 is connected to a part of the spirally wound conductive object 2, and the conductive object 11 is arranged in the vicinity of at least one of the conductive object 3 and the spirally wound conductive object 2.

According to this, it is possible to obtain a radio communication device provided with an RFID tag function which can ensure the mounting area of each antenna as large as possible, and which is sharable with an LF band RFID system or an HF band RFID system and a UHF band RFID system, while having a communication range equivalent to the communication range of each single unit of an LF band or an HF band and a UHF band.

(Second Embodiment)

In the antenna configuration of the above-mentioned first embodiment (FIG. 1, FIG. 8, FIG. 10), there may arise a problem that the band of operation is not so large. In addition, it is considered that there is a correlation between the bandwidth of operation and the current distribution on the spirally wound conductive object 2.

Figure 13:
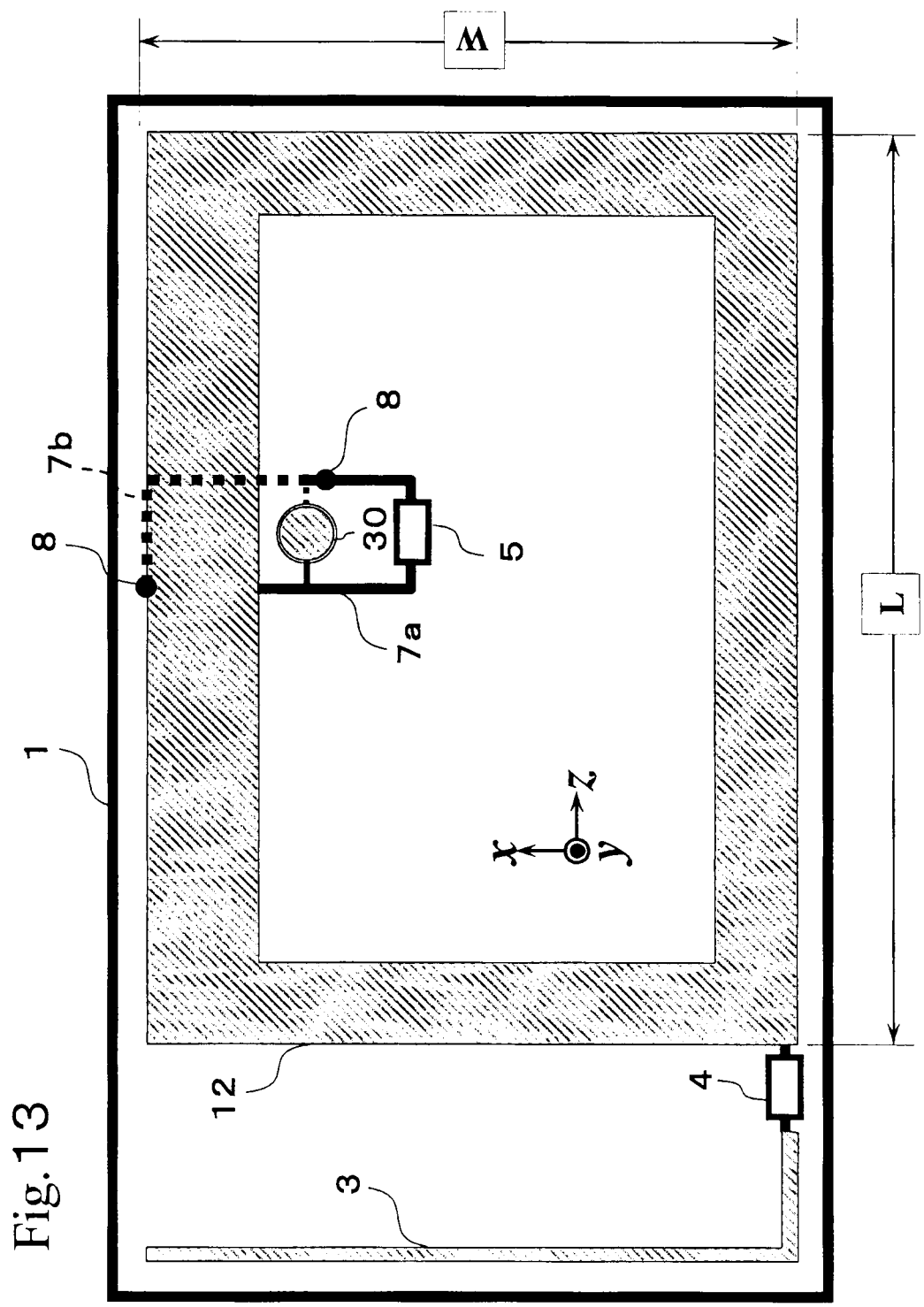
[FIG. 13] is a plan view showing an antenna configuration in which the spirally wound conductive object in FIG. 1 is replaced by a rectangular annular conductive object. (Second Embodiment)

In order to verify this, first for the sake of convenience, the spirally wound conductive object 2 was replaced by a rectangular annular conductive object 12, as shown in a plan view of FIG. 13, and the antenna characteristic in the first frequency band was calculated in the antenna configuration of FIG. 13.

Figure 14:
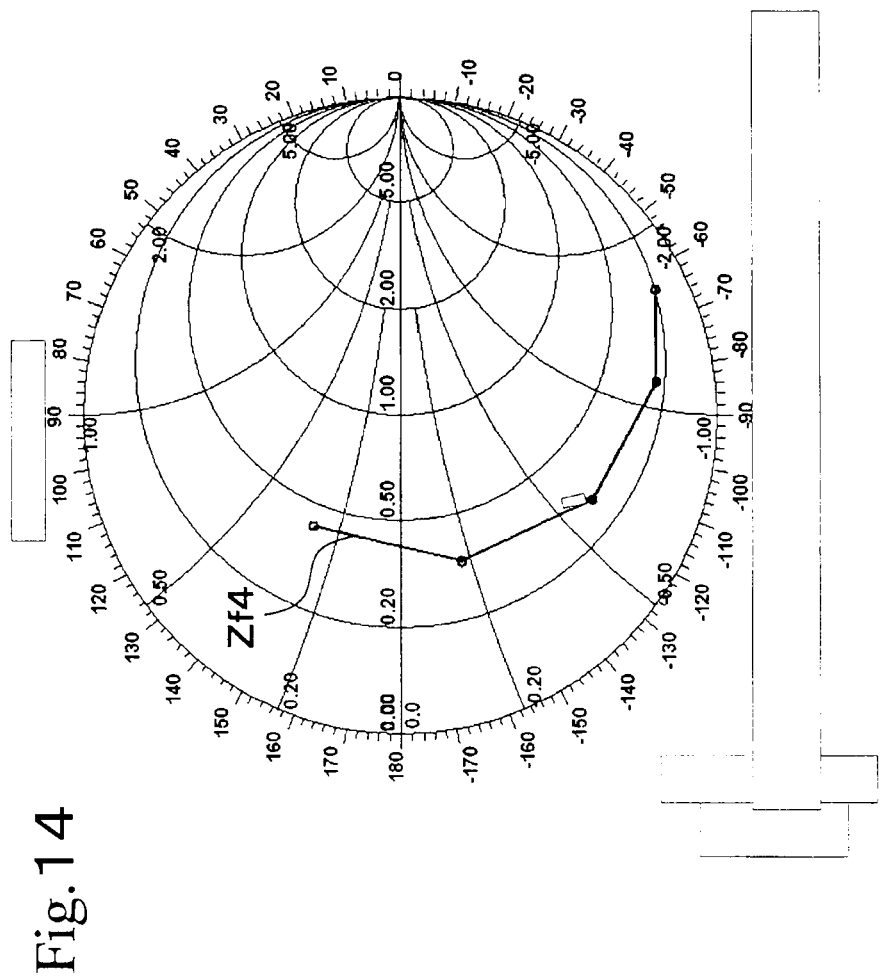
[FIG. 14] is a characteristic view showing the calculation result of an impedance frequency characteristic in the antenna configuration of FIG. 13. (Second Embodiment)

FIG. 14 is a characteristic view showing the calculation result of an impedance frequency characteristic Zf4 in the antenna configuration of FIG. 13.

Although in FIG. 14, the plot frequency of the impedance frequency characteristic Zf4 is the same as that in FIG. 4 and is shown over five points, it will be understood that the plot frequency of the impedance frequency characteristic Zf4 is smaller in the amount of reactance change than the impedance frequency characteristic Zf1 of FIG. 4, and is a wider band.

Figure 15:
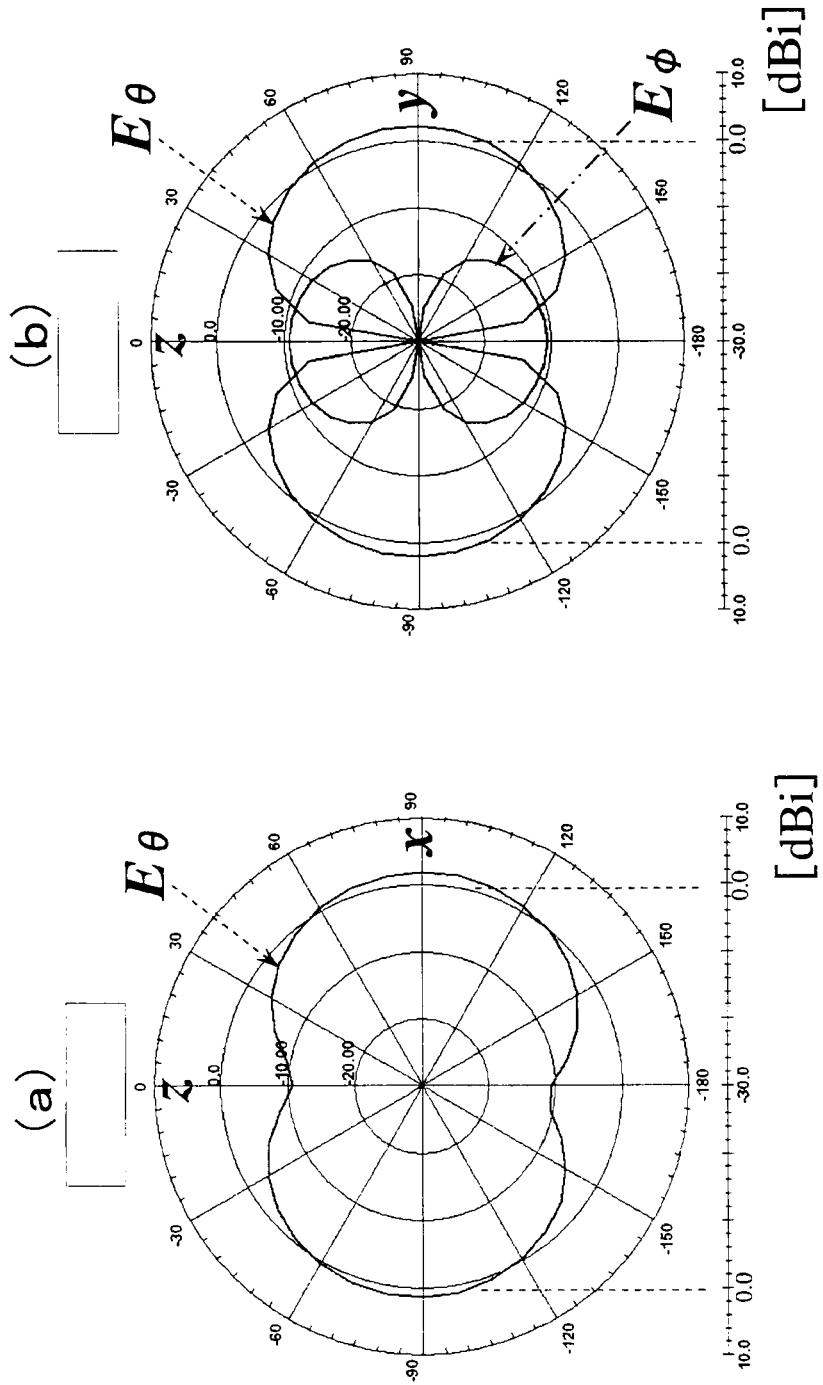
[FIG. 15] is explanatory views showing radiation pattern calculation results on an x-z plane and a y-z plane, respectively, with respect to the antenna configuration of FIG. 13. (Second Embodiment)

FIGS. 15(*a*), (*b*) are explanatory views showing radiation pattern calculation results on an x-z plane and a y-z plane, respectively, with respect to the antenna configuration of FIG. 13.

In FIG. 15 according to the antenna configuration of FIG. 13, the pattern shape is not so different as compared with that in FIG. 5 according to the antenna configuration of FIG. 1, but the gain is higher though slightly.

In addition, the calculated value of the radiation efficiency of FIG. 15 according to the antenna configuration of FIG. 13 is −0.2 dB, and is higher by about 1 dB as compared with the radiation efficiency (=−1.1 dB) of FIG. 5 according to the antenna configuration of FIG. 1.

From the above investigation, by replacing the spirally wound conductive object 2 with the rectangular annular conductive object 12, as shown in FIG. 13, it has been found that the bandwidth and the radiation efficiency can be improved simultaneously.

However, when considering the communication performance in the second frequency band, the spirally wound conductive object 2 can not of course be replaced by the rectangular annular conductive object 12, as shown in FIG. 13.

Accordingly, in actuality, in the antenna configuration of FIG. 1, by capacitively coupling between the mutually adjacent winding wires of the spirally wound conductive object 2, it is intended to improve the antenna performance in the first frequency band without affecting the communication characteristic in the second frequency band.

First, the number n at which the adjacent winding wires of the spirally wound conductive object 2 are made short circuit each other is investigated.

Figure 16:
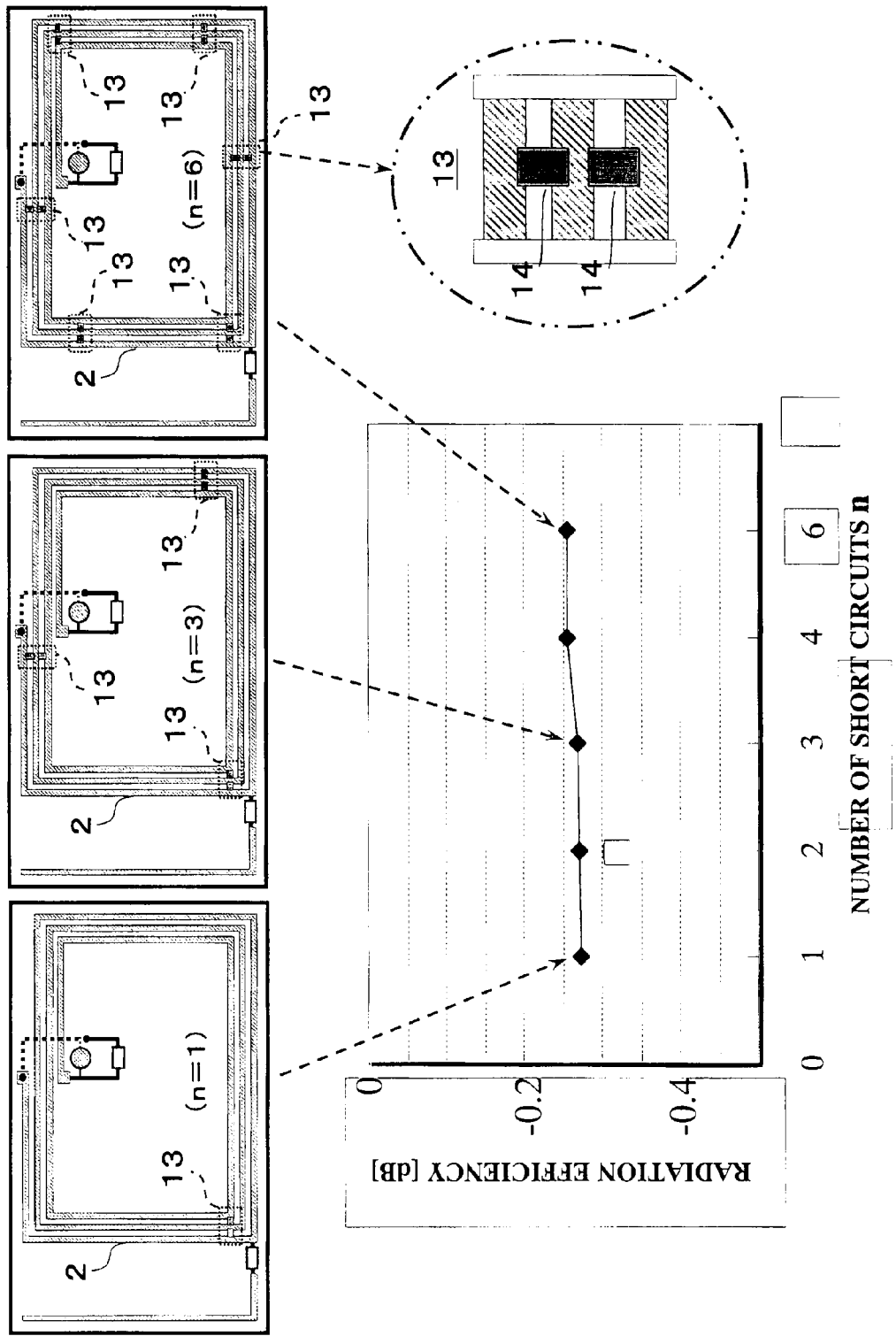
[FIG. 16] is a characteristic view showing the relation between the number of short circuits and the radiation efficiency in cases where interwinding-wire short circuiting parts are provided in the antenna configuration of FIG. 1. (Second Embodiment)

FIG. 16 is a characteristic view showing the relation between the number n of interwinding-wire short circuiting parts and the radiation efficiency, wherein the difference in radiation efficiency with respect to the number n (n=1, . . . , 6) of interwinding-wire short circuiting parts 13 which short circuit between the winding wires is shown.

In FIG. 16, the interwinding-wire short circuiting parts 13 of the spirally wound conductive object 2 are each composed of a plurality of conductive objects 14 which short circuit between adjacent winding wires, and are arranged at equal intervals with respect to the spirally wound conductive object 2.

As is clear from FIG. 16, it will be understood that the radiation efficiency is substantially unrelated to the number n of the interwinding-wire short circuiting parts 13, and only one interwinding-wire short circuiting part 13 may be arranged in the vicinity of a coupling or connecting part between the spirally wound conductive object 2 and the conductive object 3 or the integrated circuit 4.

Figure 17:
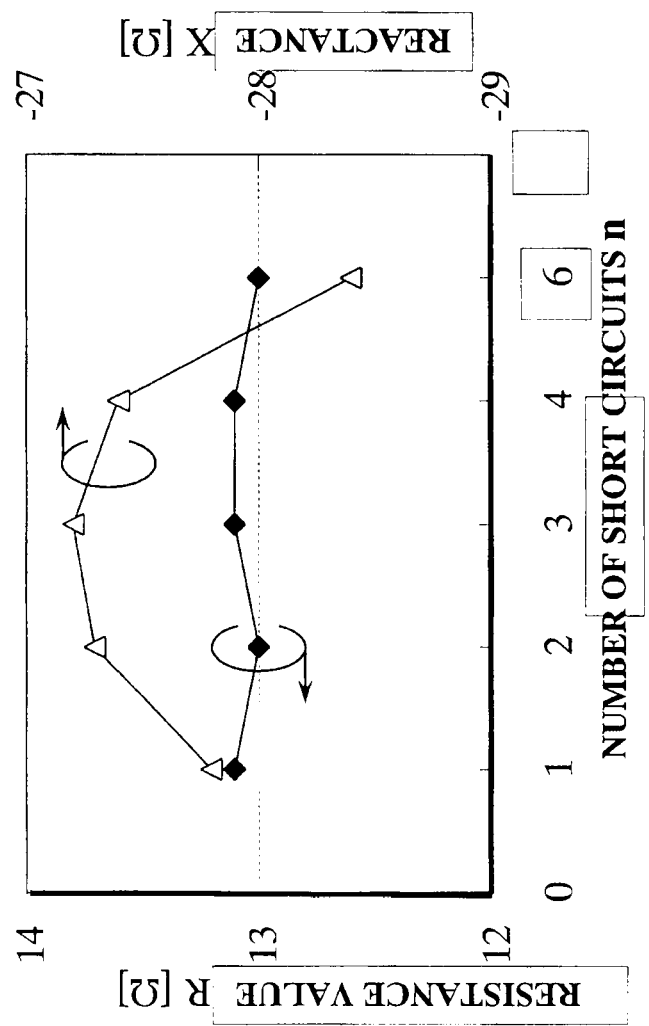
[FIG. 17] is a characteristic view showing the relation between the number of the interwinding-wire short circuiting parts and antenna impedance at a first center frequency. (Second Embodiment)

FIG. 17 is a characteristic view showing the relation between the number n of the interwinding-wire short circuiting parts 13 and antenna impedance (a resistance value R [Ω], a reactance value X [Ω]) at the first center frequency $f_1$.

As is clear from FIG. 17, too, it will be understood that as for the change of the antenna impedance due to the number n of the interwinding-wire short circuiting parts 13, the changes of both the resistance value R and the reactance value X are each equal to or less than 1 [Ω], and hence almost no change occurs in the antenna impedance.

Figure 18:
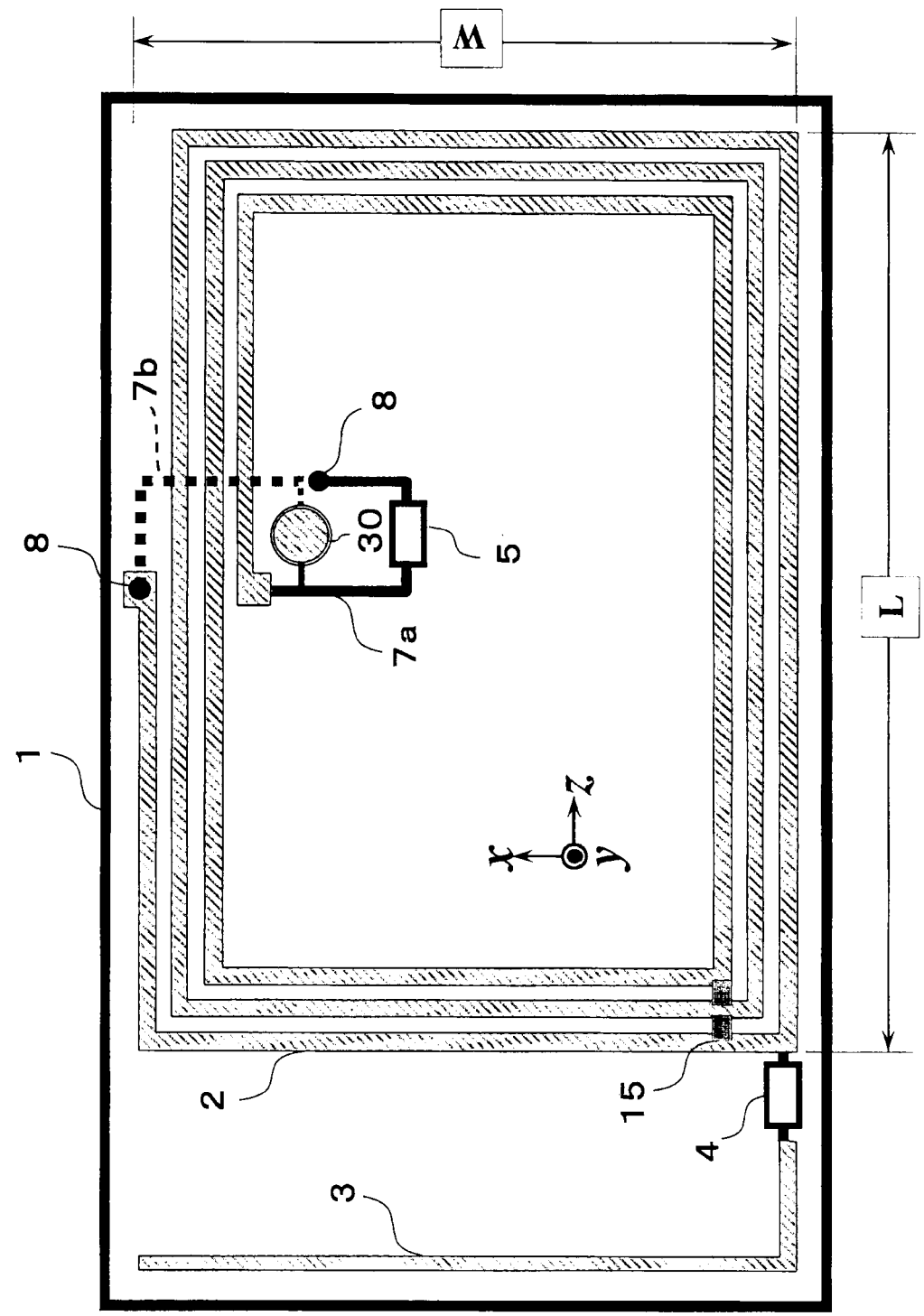
[FIG. 18] is a plan view showing a radio communication device according to the second embodiment of this invention. (Second Embodiment)

FIG. 18 is a plan view showing a configuration example according to a second embodiment of this invention, wherein there is illustrated a case where circuit elements 15 are arranged in place of the interwinding-wire short circuiting parts 13 in FIG. 16.

In FIG. 18, the circuit elements 15 connect between adjacent winding wires of the spirally wound conductive object 2 in the vicinity of the spirally wound conductive object 2 and the conductive object 3 or the integrated circuit 4.

Then, the relation between a capacitor electrostatic capacitance value at the time when the circuit elements 15 are capacitors and the above-mentioned characteristic is investigated.

Figure 19:
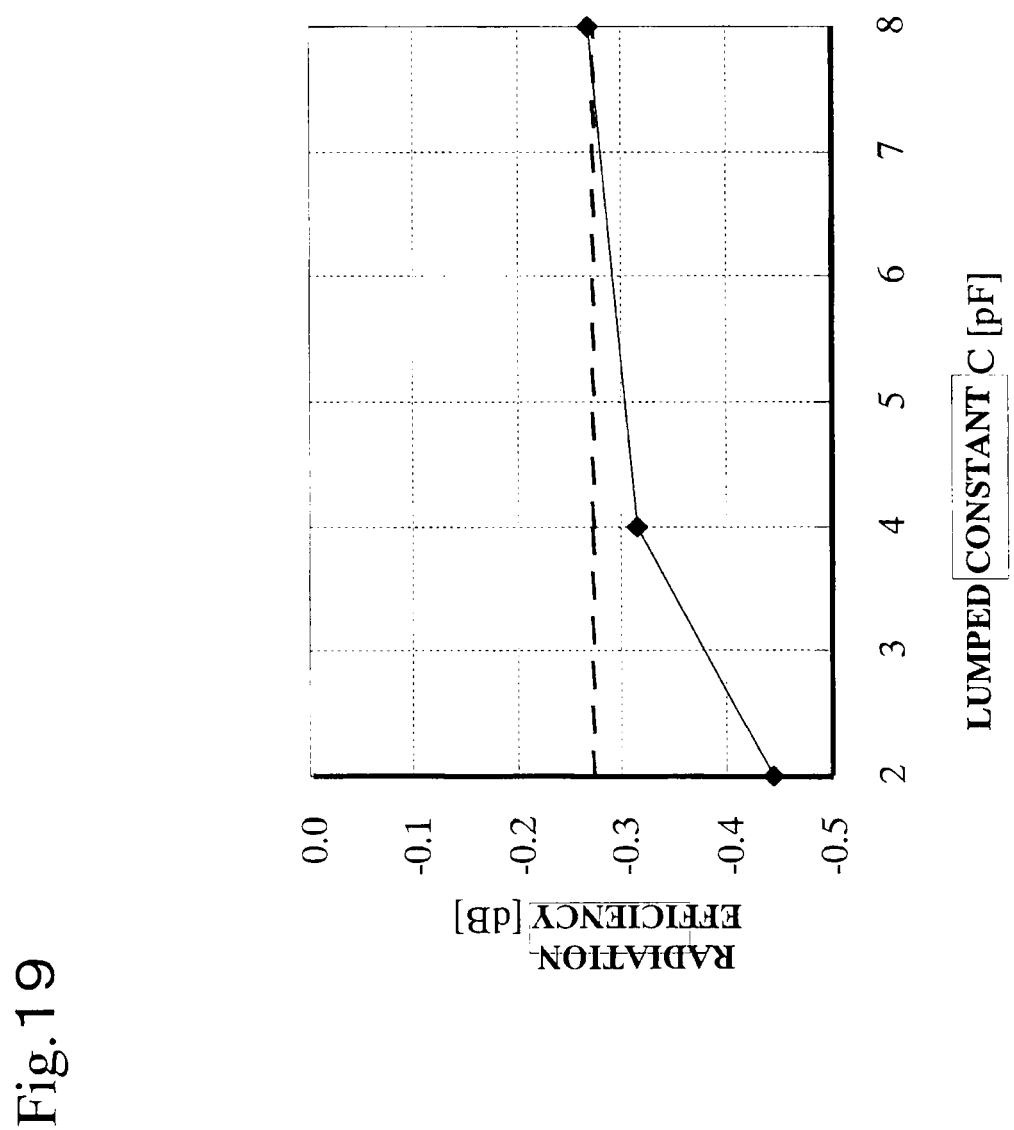
[FIG. 19] is a characteristic view showing the relation between the electrostatic capacitance value of capacitors in FIG. 18 and the radiation efficiency at the first center frequency. (Second Embodiment)

FIG. 19 is a characteristic view showing the relation between the electrostatic capacitance value (lumped constant) of the capacitors and the radiation efficiency at the first center frequency $f_1$.

As is clear from FIG. 19, there is a tendency that as the electrostatic capacitance value C becomes smaller, the radiation efficiency tends to deteriorate, but when C≧2 pF, the amount of deterioration of the radiation efficiency is within 0.2 dB, and in practice, there is almost no problem.

Figure 20:
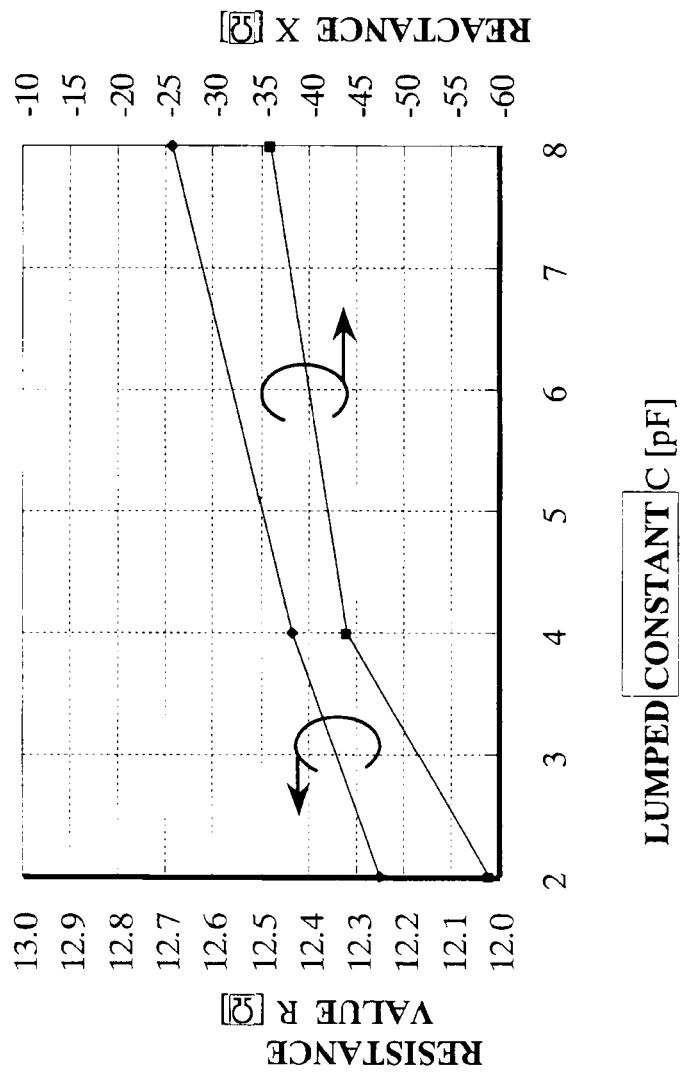
[FIG. 20] is a characteristic view showing the relation between the electrostatic capacitance value of the capacitors in FIG. 18 and the antenna impedance at the first center frequency. (Second Embodiment)

FIG. 20 is a characteristic view showing the relation between the electrostatic capacitance value C of the capacitors and the antenna impedance (the resistance value R, the reactance value X) at the first center frequency $f_1$, and it can be seen that the same tendency as that in FIG. 19 is shown.

Figure 21:
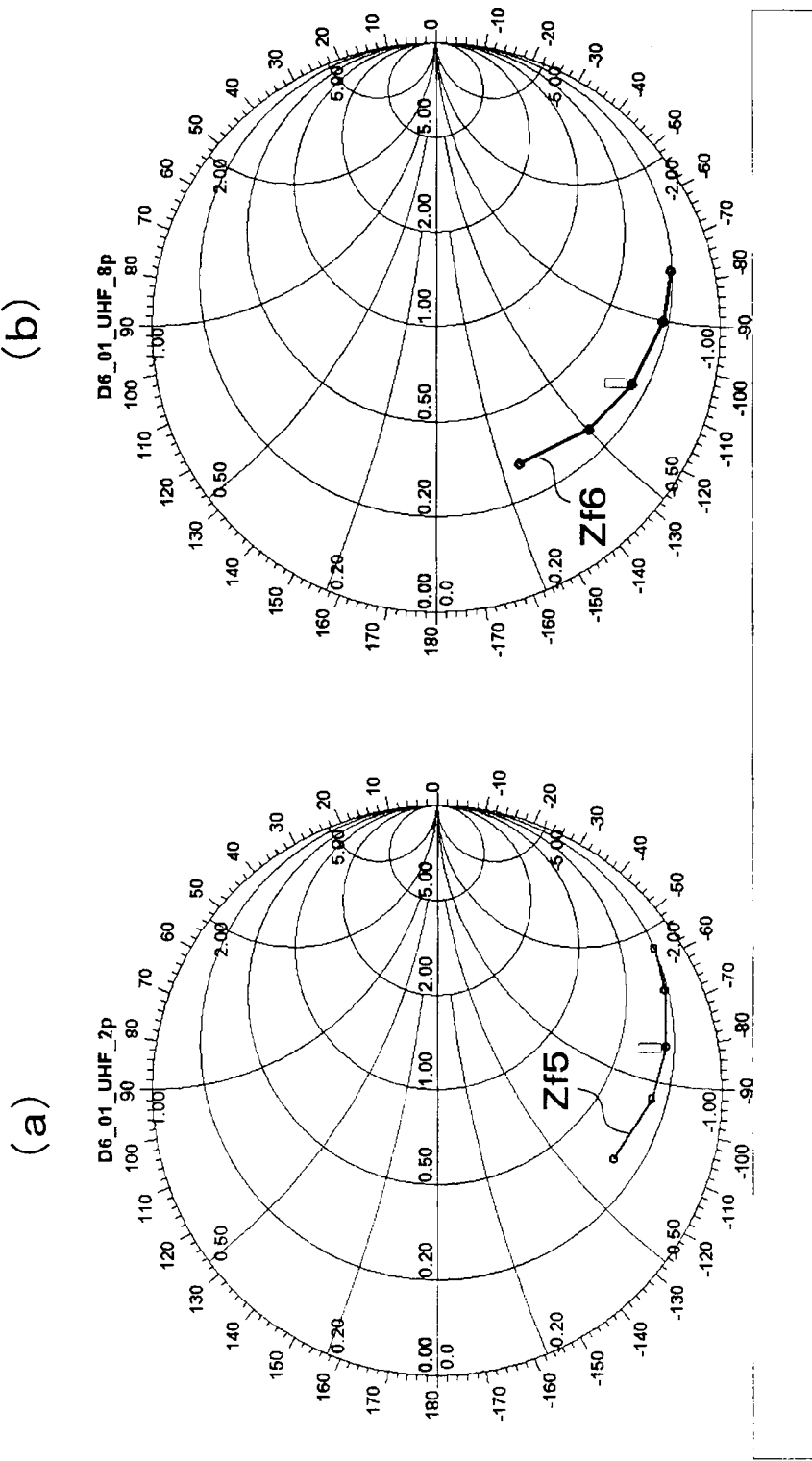
[FIG. 21] is a characteristic view showing the impedance frequency characteristic in a first frequency band in the antenna configuration of FIG. 18. (Second Embodiment)

FIG. 21 is a characteristic view in which an impedance frequency characteristic in the first frequency band is plotted on a Smith chart, wherein FIG. 21(a) shows an impedance frequency characteristic Zf5 in cases where the electrostatic capacitance value C is 2 pF, and FIG. 21(b) shows an impedance frequency characteristic Zf6 in cases where the electrostatic capacitance value C is 8 pF.

In FIG. 21, the plot frequency is shown from 0.95 $f_1$ to 1.05 $f_1$ in increments of 0.025 $f_1$ over five points.

As can be seen from a comparison between the impedance frequency characteristic Zf6 (C=8 pF) of FIG. 21(b) and the impedance frequency characteristic Zf5 (C=2 pF) of FIG. 21(a), there is a tendency that as the electrostatic capacitance value C becomes smaller, the antenna impedance displaces to a capacitive side, but this can be compensated for by setting the electric length of the conductive object 3 to be longer, so it does not become a large problem.

Figure 22:
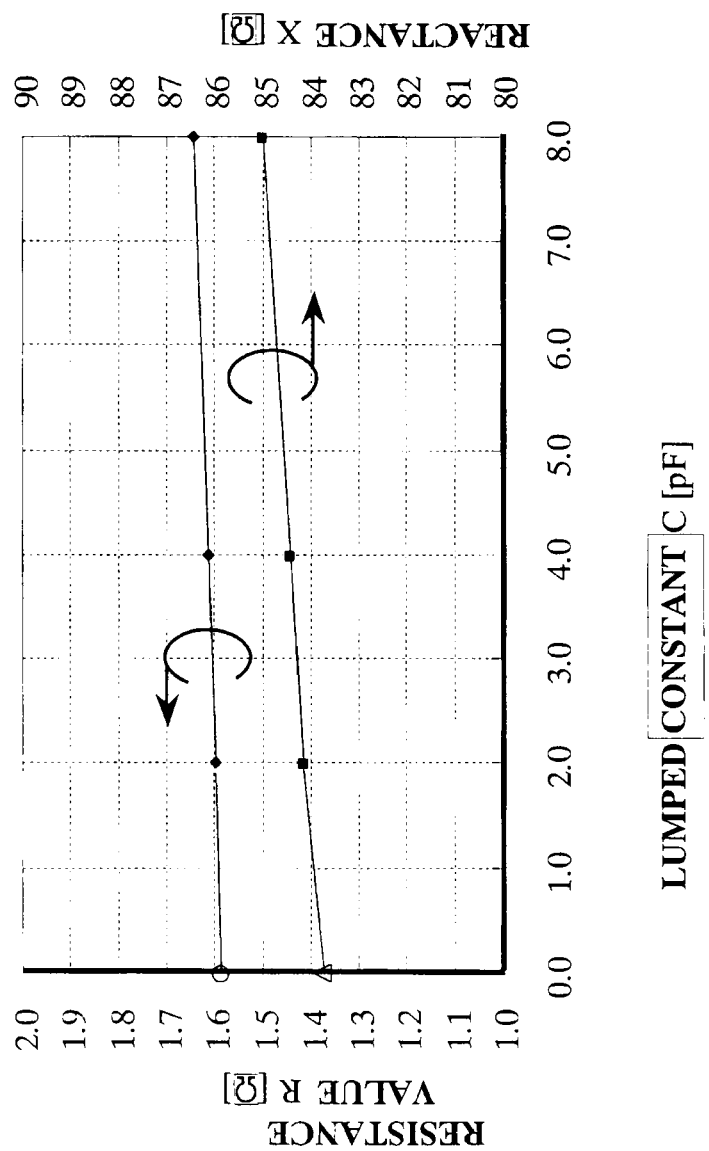
[FIG. 22] is a characteristic view showing the relation between the impedance and the electrostatic capacitance value of a spirally wound conductive object in FIG. 18. (Second Embodiment)

On the other hand, FIG. 22 is a characteristic view showing the relation between the impedance (the resistance value R, the reactance X) of the spirally wound conductive object 2 and the electrostatic capacitance value C, wherein there is shown the characteristic of the impedance at the second center frequency $f_2$ when looking at the spirally wound conductive object 2 from line A-A' in FIG. 1.

As is clear from FIG. 22, it can be seen that the impedance characteristic at the second center frequency $f_2$ does not substantially depend on the electrostatic capacitance value C, too.

Hereinafter, the effect of the interwinding-wire capacitive coupling will be considered in further detail by taking, as an example, a case where the frequency characteristic of the radiation efficiency is calculated according to a numerical electromagnetic field analysis by changing the number of turns, the outer size, and the electrostatic capacitance value C of the spirally wound conductive object 2, while referring to FIG. 23 and FIG. 24. Here, note that the unit of the numerical values shown on characteristic curves in each figure is [λc].

FIGS. 23(a) through (c) are explanatory views showing the results of calculation of the frequency characteristic of the radiation efficiency obtained by setting the number of turns to "3", the length W in the x direction of the spirally wound conductive object 2 to 0.133 λc, and the length L (=Lc) in the z direction of the spirally wound conductive object 2 as a parameter.

In FIGS. 23(a) through (c), the axis of abscissa is the frequency normalized by a frequency of 910 MHz (fc=910 MHz), and λc is the wavelength in air of a radio wave of frequency 910 MHz.

FIG. 23(a) shows a characteristic when C=0 pF (electrically opened), FIG. 23(b) shows a characteristic when C=2 pF, and FIG. 23(c) shows a characteristic when C=4 pF.

Figure 23:
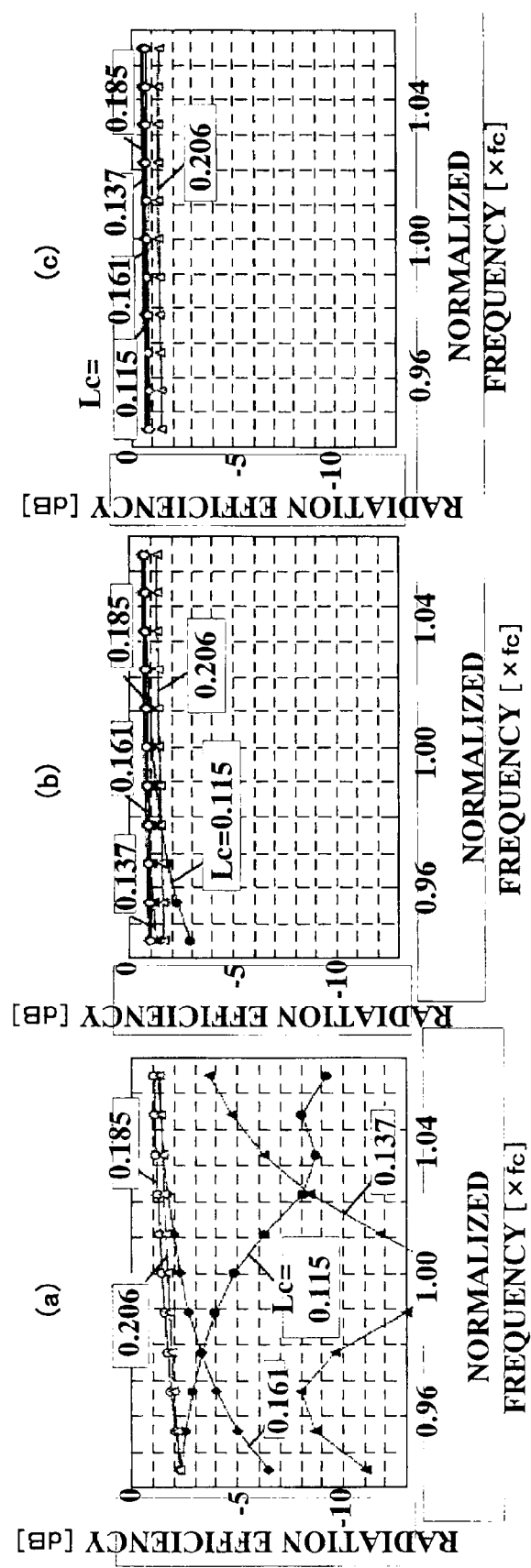
[FIG. 23] is an explanatory view for explaining in detail an effect according to the second embodiment of this invention, wherein in cases where the number of turns of the spirally wound conductive object is set to "3", the result of calculating the frequency characteristic of the radiation efficiency is illustrated. (Second Embodiment)

As is clear from FIG. 23, it can be seen that when C=2 pF, too, the dependence of the radiation efficiency on the size of the spirally wound conductive object is suppressed to a large extent, and when C becomes 4 pF (C=4 pF), a high radiation efficiency of −1.5 dB or more is obtained over a wide band for the entire size of the spirally wound conductive object.

On the other hand, FIGS. 24(a) through (e) are explanatory views showing calculation results in the case of setting the number of turns to "6", wherein FIG. 24(a) shows a characteristic when C=0 pF (electrically opened).

Figure 24:
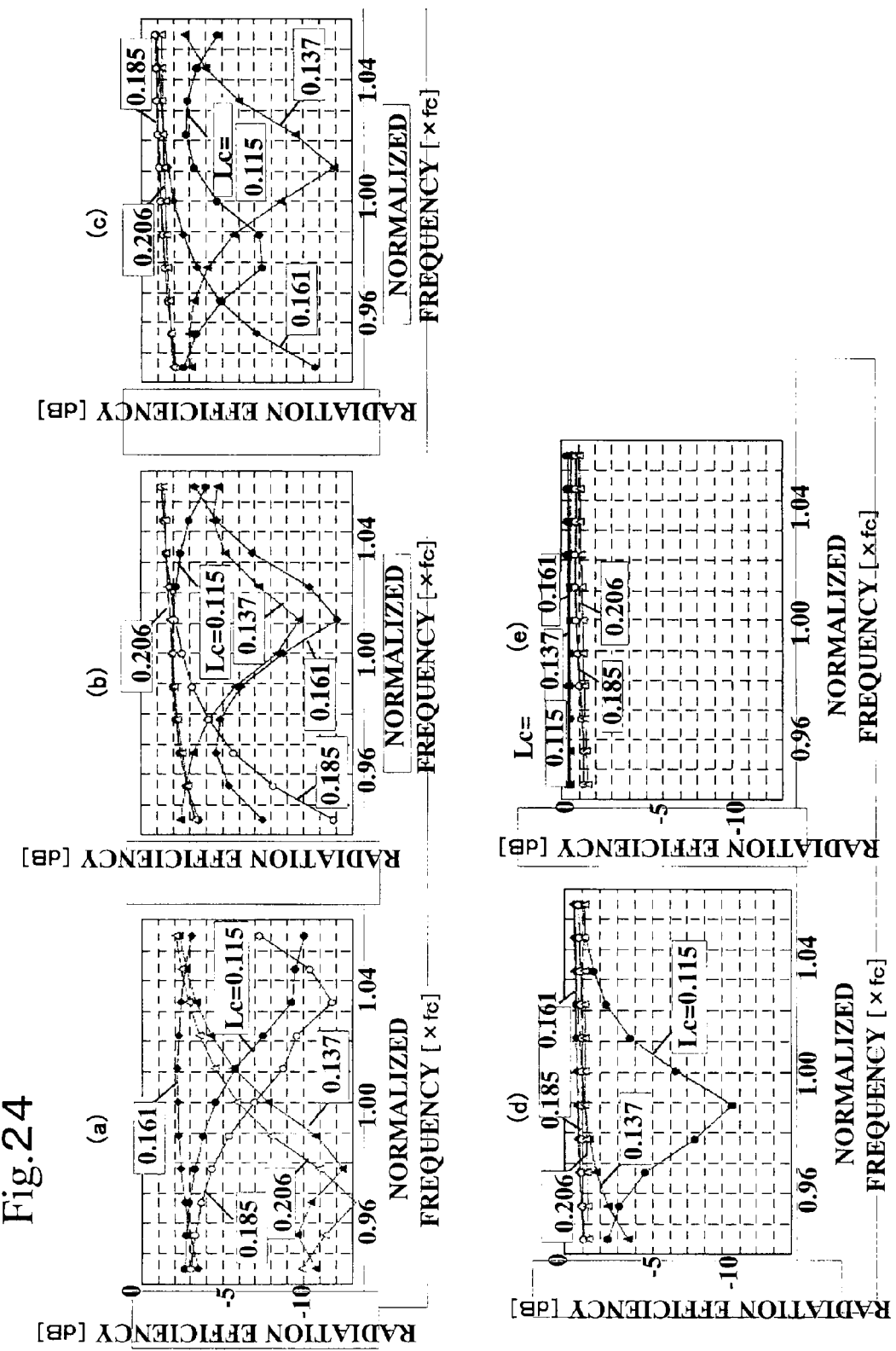
[FIG. 24] is an explanatory view for explaining in detail an effect according to the second embodiment of this invention, wherein in cases where the number of turns of the spirally wound conductive object is set to "6", the result of calculating the frequency characteristic of the radiation efficiency is illustrated. (Second Embodiment)

In addition, FIG. 24(b) shows a characteristic when C=2 pF, FIG. 24(c) shows a characteristic when C=4 pF, FIG. 24(d) shows a characteristic when C=8 pF, and FIG. 24 (e) shows a characteristic when C=∞ (infinity) pF (electrically short circuited).

As is clear from FIG. 24, it can be seen that by capacitively coupling between the adjacent winding wires of the spirally wound conductive object 2, it is possible to suppress substantially the dependence of the radiation efficiency on the size of the spirally wound conductive object to a large extent and at the same time to ensure a high radiation efficiency over a wide band, though a required electrostatic capacitance value tends to become larger as compared with the case of FIG. 23 (three turns).

As described above, according to the radio communication device of the second embodiment of this invention (FIG. 16, FIG. 18), by providing the circuit elements 15 which capacitively couple between adjacent winding wires of the spirally wound conductive object 2, and by selecting the capacitance values thereof in an appropriate manner, it becomes possible to improve the antenna performance in the first frequency band without substantially affecting the communication characteristic at the second center frequency $f_2$.

Here, note that the circuit elements 15 are not limited to chip capacitors, but other means may instead be used as long as it has a frequency characteristic in which a current in the first frequency band is permitted to pass but a current in the second frequency band is interrupted.

Accordingly, for the circuit elements 15, there can be used, as a frequency selective coupling unit, arbitrary resonators such as for example dielectric resonators used for filters, ceramic resonators, piezoelectric resonators, etc.

Here, the piezoelectric resonators are filters in each of which electrodes are formed on the front and back surfaces, respectively, of a piezoelectric thin film, and vibration of the thin film is utilized. In addition, a thing composed of the piezoelectric resonators, which are connected in the form of a ladder, is called an FBAR (Film Bulk Acoustic Resonator) filter, and is known as a band pass filter having a steep characteristic with low loss.

As described above, the radio communication device according to the second embodiment of this invention is further provided with the circuit elements 15 (frequency selective coupling unit such as, for example, a capacitive coupling unit) that are arranged between some adjacent winding wires of the spirally wound conductive object, as shown in FIG. 18, and serve to connect between the adjacent winding wires by capacitive reactances, wherein the circuit elements 15 are constituted, for example, by resonators.

According to this, it becomes possible to select the electrical property of the circuit elements 15 in an appropriate manner, and to improve the antenna performance in the first frequency band without substantially affecting the communication characteristic at the second center frequency $f_2$.

(Third Embodiment)

When consideration is made to put into practical use the antenna configuration shown in the above-mentioned first and second embodiments (FIG. 1, FIG. 8, FIG. 10, FIG. 16, FIG. 18), arbitrary circuit element components can not necessarily be mounted always on the plate-like object 1, and an increase in the number of parts will generally cause an increase in the manufacturing cost.

Figure 25:
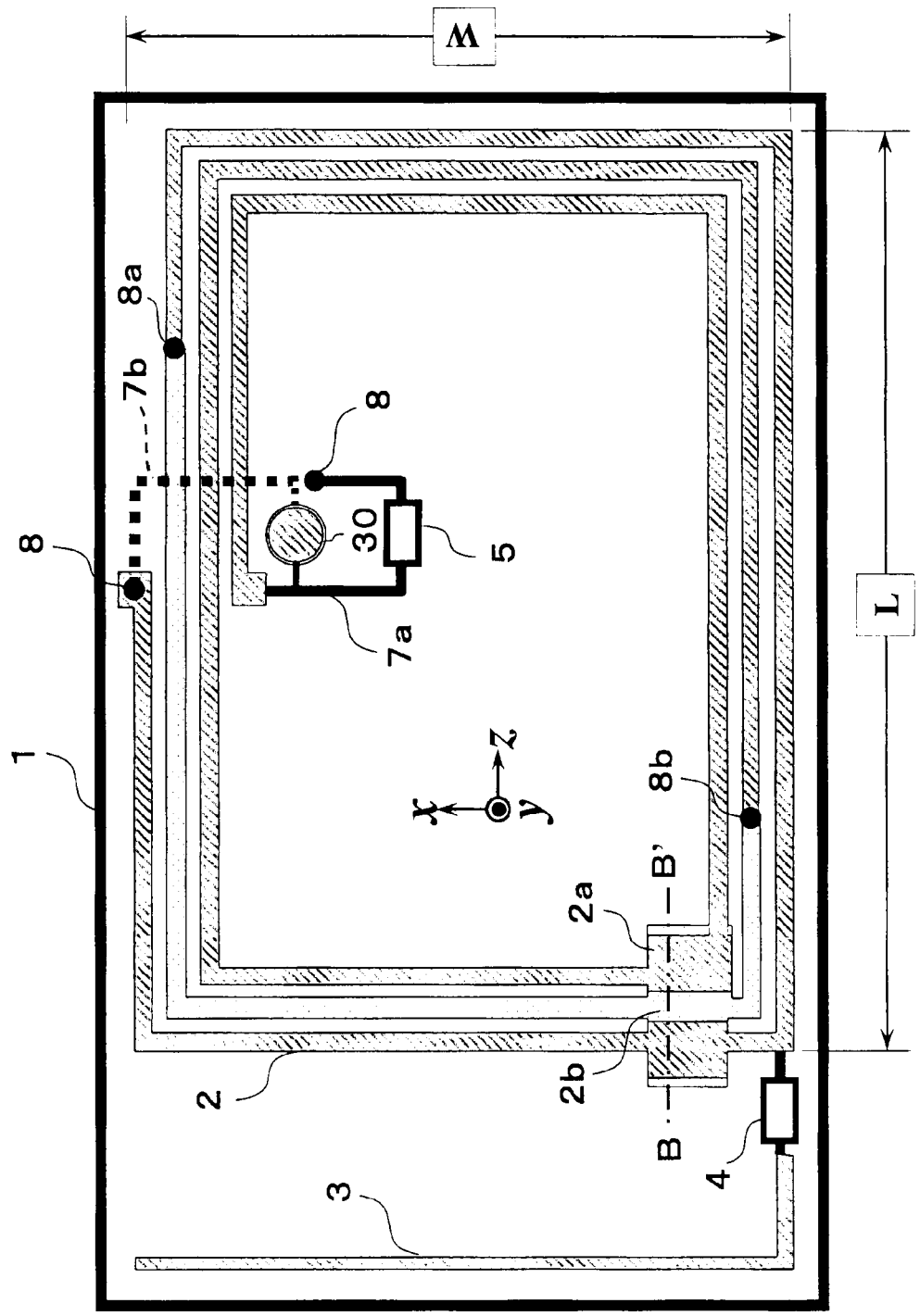
[FIG. 25] is a plan view showing a radio communication device according to a third embodiment of this invention. (Third Embodiment)
Figure 26:
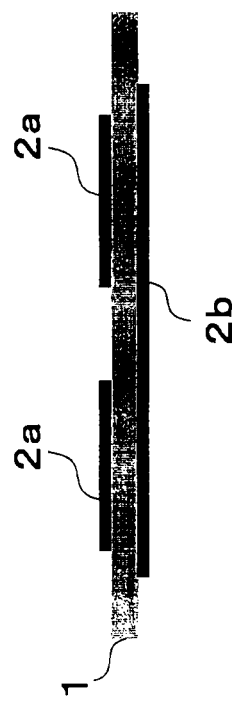
[FIG. 26] is a cross sectional view along line B-B' in FIG. 25. (Third Embodiment)

Accordingly, a configuration is considered in which adjacent winding wires of the spirally wound conductive object 2 are capacitively coupled only by conductive objects 2a, 2b, as shown in FIG. 25 and FIG. 26, in place of the configuration of FIG. 18.

FIG. 25 is a plan view showing a radio communication device according to a third embodiment of this invention, and FIG. 26 is a cross sectional view along line B-B' in FIG. 25.

FIG. 25 and FIG. 26 show one configuration example in which adjacent winding wires of the spirally wound conductive object 2 are capacitively coupled with each other in the first frequency band.

In FIG. 25, a part of the spirally wound conductive object 2 (a section from a different layer connection part 8a to a different layer connection part 8b) is a conductive object that is arranged on a back surface of the plate-like object 1.

In this case, as shown in FIG. 26, in a position in which capacitive coupling is to be made, the existing surfaces of the winding wires are formed in such a manner that they becomes the front side, the back side, and the front side of the plate-like object 1 in order from the outside to the inside, and at the same time, desirably, the winding wire shapes of the conductive objects 2a, 2b are locally changed so that they overlap with their adjacent winding wires in that position.

That is, in this example, the width of each of the conductive objects 2a on the front side of the plate-like object 1 is formed larger in the capacitive coupling position or portion thereof than in the other portions thereof, and at the same time, the width of the conductive object 2b on the back side of the plate-like object 1 is formed to be equal to or more than twice of the width of each conductive object 2a.

By adopting the antenna configuration of FIG. 25 and FIG. 26, the electrostatic capacitance between the adjacent winding wires of the spirally wound conductive object 2 can be partially made larger, so it is possible to obtain the same effect as in the case where the circuit elements 15 are constituted by the capacitors in the above-mentioned the second embodiment (FIG. 18), and at the same time to reduce the number of parts required.

As described above, a capacitive coupling unit in the radio communication device according to the third embodiment of this invention is constructed by forming the winding wire width of the spirally wound conductive object 2 to be large, as shown in FIG. 25 and FIG. 26.

That is, as a structure having a frequency characteristic in which a current in the first frequency band is permitted to pass but a current in the second frequency band is interrupted, the spirally wound conductive object 2 is formed on the opposite side surfaces, i.e., on the front surface and the back surface, of the plate-like object 1, and at the same time, the winding wire width of each of the spirally wound conductive objects 2a, 2b is formed to be partially large.

According to this, in both of the frequency bands, i.e., the first frequency band and the second frequency band, it becomes possible to commonly use the spirally wound conductive object 2 as an antenna conductor.

As a result of this, similar to the above-mentioned first and second embodiments, the coil conductor for the LF band or for the HF band can be made use of as a UHF band antenna conductor, so it is possible to obtain a radio communication device according to an RFID card type tag, which can ensure the mounting area of each antenna as large as possible, and which is sharable with an LF band or an HF band and a UHF band, while having a communication range equivalent to the communication range of each single unit of the HF band and the UHF band.

Further, it is possible to obtain a radio communication device which can reduce the number of parts required, and at the same time has higher performance, in comparison with the configuration of the above-mentioned second embodiment (FIG. 18).

(Fourth Embodiment)

Figure 27:
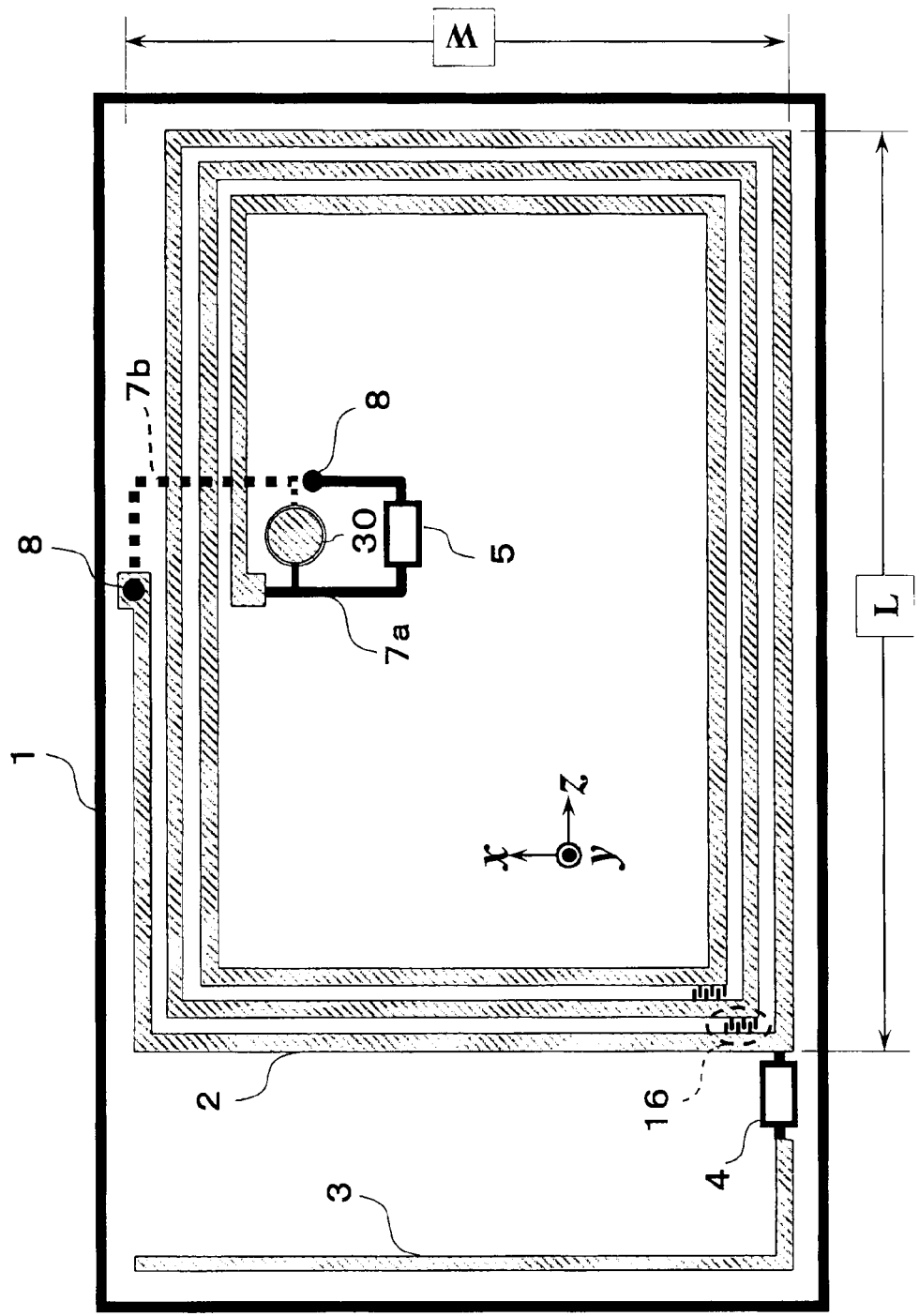
[FIG. 27] is a plan view showing a radio communication device according to a fourth embodiment of this invention. (Fourth Embodiment)
Figure 28:
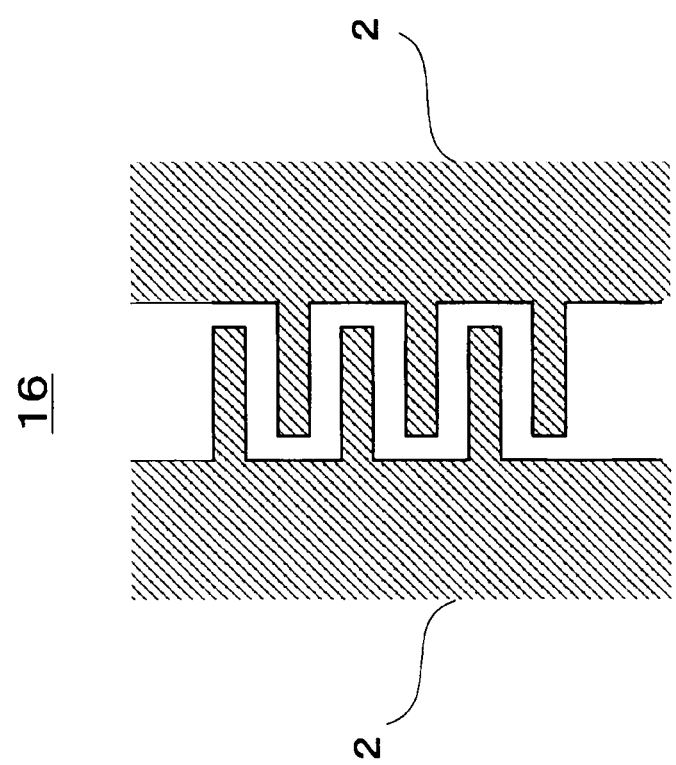
[FIG. 28] is a plan view showing an interdigital capacitor in FIG. 27 on an enlarged scale. (Fourth Embodiment)

In the above-mentioned third embodiment, the spirally wound conductive object 2 is formed on the opposite side surfaces, i.e., on the front surface and the back surface, of the plate-like object 1, and at the same time, the winding wire width of each of the spirally wound conductive objects 2a, 2b in the capacitive coupling position is formed to be partially large, but as shown in FIG. 27 and FIG. 28, the spirally wound conductive object 2 may be formed only in the front surface of the plate-like object 1, and the winding wire shape of the spirally wound conductive object 2 may be partially changed or deformed, as a capacitive coupling unit.

FIG. 27 is a plan view showing a radio communication device according to a fourth embodiment of this invention, wherein there is illustrated a case where an interdigital capacitor 16 is formed in a position in which capacitively coupling is made, as another configuration example in which adjacent winding wires of the spirally wound conductive object 2 are capacitively coupled with each other in the first frequency band.

FIG. 28 is a plan view showing the interdigital capacitor 16 on an enlarged scale. In FIG. 28, the interdigital capacitor 16 has a configuration in which parts of the spirally wound conductive object 2 are each formed into a comb shape, and are capacitively coupled with each other by being mutually inserted into each other.

According to the antenna configuration of FIG. 27 and FIG. 28, the electrostatic capacitance between the adjacent winding wires of the spirally wound conductive object 2 can be partially increased.

In addition, in comparison with the configuration of the above-mentioned third embodiment (FIG. 25), the different layer connection parts 8a, 8b, which serve to connect the conductive object 2a formed on the front surface of the plate-like object 1 and the conductive object 2b formed on the back surface of the plate-like object 1, can be omitted, thus making it possible to reduce the cost of manufacture.

As described above, the capacitive coupling unit in the radio communication device according to the fourth embodiment of this invention is constituted by the interdigital capacitor 16 which is formed between the winding wires by partially changing the winding wire shape of the spirally wound conductive object, as shown in FIG. 27 and FIG. 28.

That is, as a structure having a frequency characteristic in which a current in the first frequency band is permitted to pass but a current in the second frequency band is interrupted, there is provided a configuration in which the spirally wound conductive object 2 is formed only on the front surface of the plate-like object 1, and the winding wire shape of the spirally wound conductive object 2 is partially changed or deformed to form the interdigital capacitor 16 partially between the winding wires.

According to this, in both of the frequency bands, i.e., the first frequency band and the second frequency band, it becomes possible to commonly use the spirally wound conductive object 2 as an antenna conductor.

As a result, similar to the above-mentioned first through third embodiments, the coil conductor for the LF band or for the HF band can be made use of as a UHF band antenna conductor, so it is possible to obtain a radio communication device according to an RFID card type tag, which can make the mounting area of each antenna as large as possible, and which is sharable with an LF band or an HF band and a UHF band, while having a communication range equivalent to the communication range of each of the LF band or the HF band and the UHF band.

In addition, it becomes possible to reduce the cost of manufacture, in comparison with the configuration of the above-mentioned third embodiment (FIG. 25).

(Fifth Embodiment)

Figure 29:
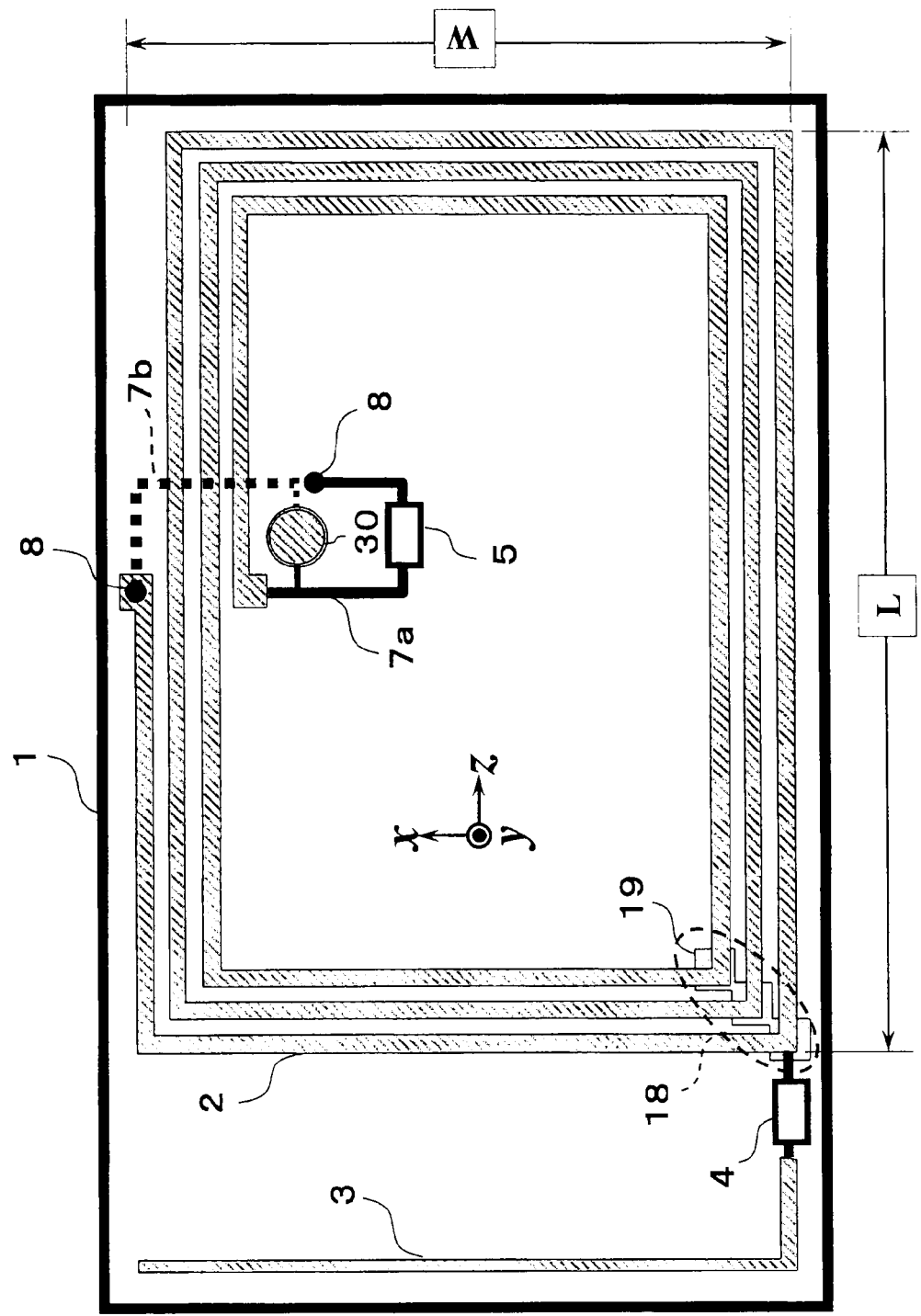
[FIG. 29] is a plan view showing a radio communication device according to a fifth embodiment of this invention. (Fifth Embodiment)
Figure 30:
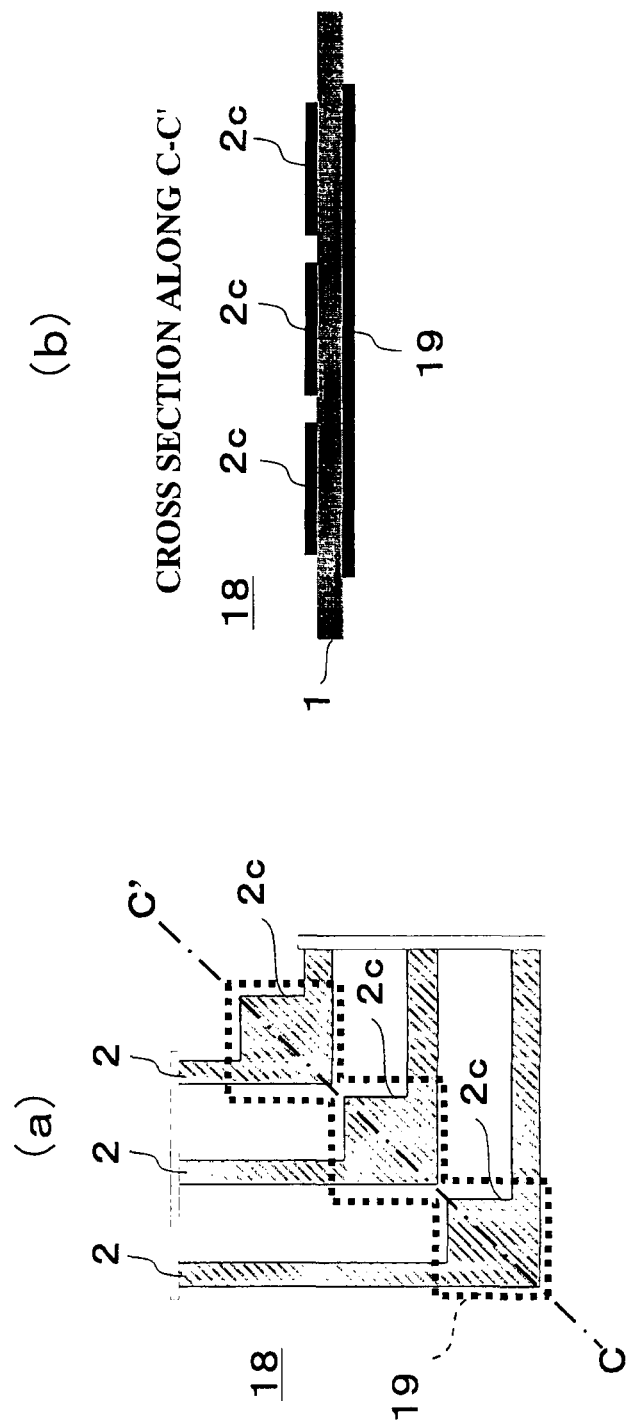
[FIG. 30] is a plan view showing an interwinding-wire capacitive coupling unit in FIG. 29 on an enlarged scale and a cross sectional view along line C-C'. (Fifth Embodiment)

Although the interdigital capacitor 16 in the above-mentioned embodiment 4 (FIG. 27, FIG. 28) has the capacitive coupling portion of the spirally wound conductive object 2 formed in the comb shape, there is a possibility that a sufficient electrostatic capacitance can not be obtained with a small area, and hence, as shown in FIG. 29 and FIG. 30, an interwinding-wire capacitive coupling unit 18 may be constituted by a conductive object 19 that is formed on the back surface of the plate-like object 1.

FIG. 29 is a plan view showing a radio communication device according to a fifth embodiment of this invention. In addition, FIGS. 30(*a*), (*b*) are a plan views showing the interwinding-wire capacitive coupling unit 18 in FIG. 29 on an enlarged scale, and a cross sectional view along line C-C', respectively.

In FIG. 29 and FIG. 30, the interwinding-wire capacitive coupling unit 18 is constituted by partially enlarged portions which are formed in the individual winding wires, respectively, of the spirally wound conductive object 2 formed on the front surface of the plate-like object 1, and the conductive object 19 formed on the back surface of the plate-like object 1 at the partially enlarged portions.

In addition, in FIGS. 30(*a*), (*b*), the conductive objects 2*c* in the capacitive coupling position or portion are each formed to be larger in width than the other portions, and the conductive object 19 on the back surface side of the plate-like object 1 has a width formed so as to cover the overall width of the plurality of conductive objects 2*c*.

According to the antenna configuration of FIG. 29 and FIG. 30, the above-mentioned different layer connection parts 8*a*, 8*b* (FIG. 25) are made unnecessary, and hence, it becomes possible to construct a interwinding-wire capacitor of a parallel plate type, without increasing the number of different interlayer connection parts.

Figure 31:
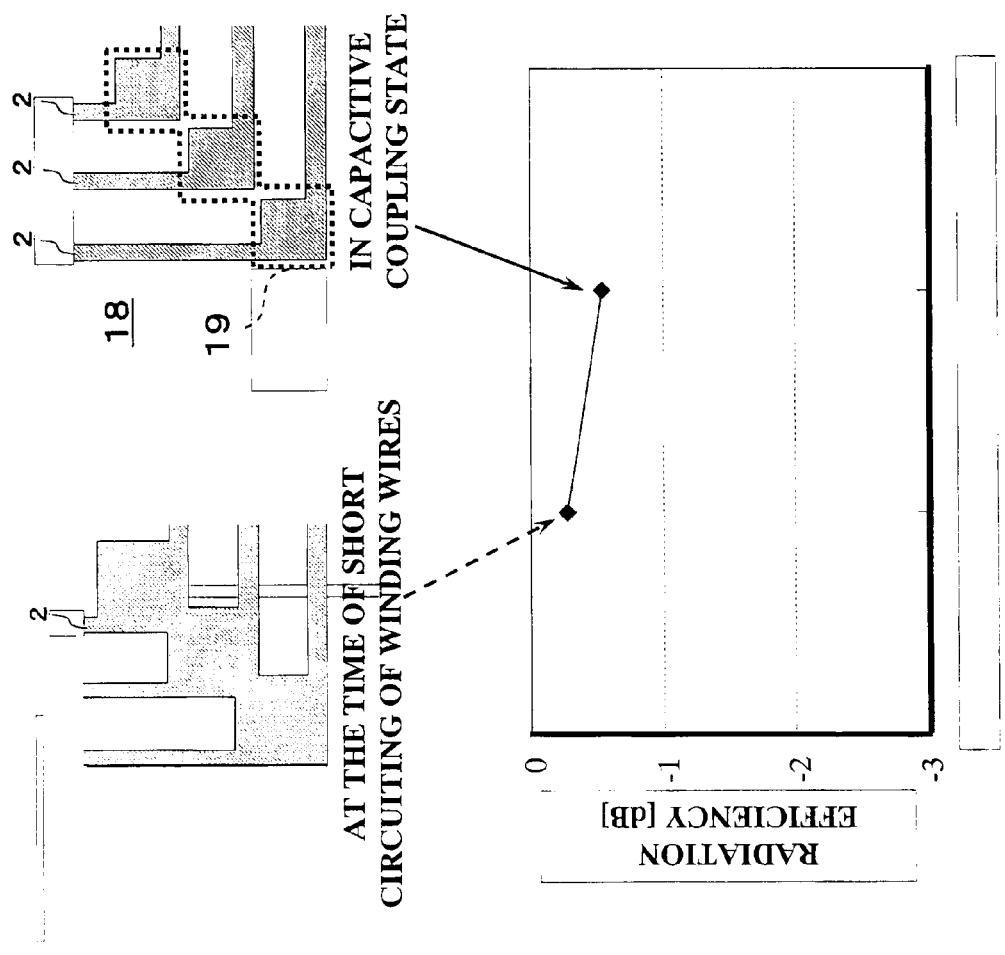
[FIG. 31] is a characteristic view showing the radiation efficiency at a first center frequency according to the fifth embodiment of this invention. (Fifth Embodiment)

FIG. 31 is a characteristic view showing the radiation efficiency at the first center frequency $f_1$ according to the fifth embodiment (FIG. 29, FIG. 30) of the present invention, wherein the radiation efficiency in a capacitive coupling state by the interwinding-wire capacitive coupling unit 18 (capacitive coupling position) is shown as compared with the radiation efficiency in the case where the winding wires are short circuited.

As is clear from FIG. 31, it can be seen that the same radiation efficiency as in the case where the interwinding wires are short circuited is obtained by means of the interwinding-wire capacitive coupling unit 18.

Figure 32:
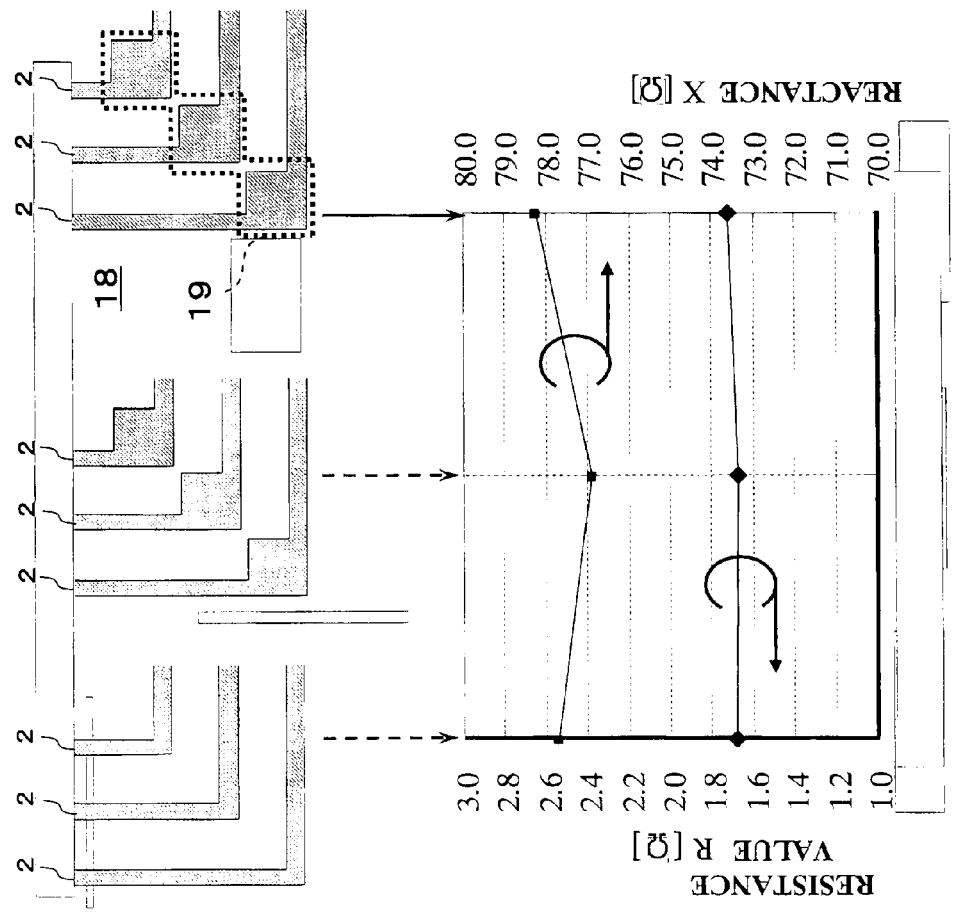
[FIG. 32] is a characteristic view showing the input impedance of a spirally wound conductive object at the first center frequency with respect to an antenna configuration of the fifth embodiment of this invention. (Fifth Embodiment)

FIG. 32 is a characteristic view showing the input impedance (resistance value R, reactance value X) of the spirally wound conductive object 2 at the second center frequency $f_2$ with respect to the antenna configuration of the fifth embodiment of this invention, wherein the input impedance is shown as compared with an input impedance value in the case where the interwinding-wire capacitive coupling unit 18 does not exist.

As is clear from FIG. 32, it can be seen that there occurs almost no amount of change in impedance due to the presence or absence of the interwinding-wire capacitive coupling unit 18, and such an amount of change is within the range of no problem.

Accordingly, by the antenna configuration of FIG. 29 and FIG. 30, the electrostatic capacitance between the adjacent winding wires of the spirally wound conductive object 2 can be partially increased, and in addition, it becomes possible to obtain a higher interwinding-wire electrostatic capacitance with a smaller area, as compared with the configuration of the above-mentioned fourth embodiment (FIG. 27).

As described above, the radio communication device according to the fifth embodiment of the present invention is provided with the conductive object 19 (fourth conductive object) that is arranged in a manner separated a predetermined interval from, and overlapped with, parts of the spirally wound conductive object 2, as shown in FIG. 29.

That is, as an antenna configuration having a frequency characteristic in which a current in the first frequency band is permitted to pass but a current in the second frequency band is interrupted, there is provided the interwinding-wire capacitive coupling unit 18 in which the spirally wound conductive object 2 is formed only on the front surface of the plate-like object 1, with the winding wire shape of the spirally wound conductive object 2 being partially changed or deformed, and which has the conductive object 19 formed on the back surface of the plate-like object 1 at the partially deformed portions.

According to this, in both of the frequency bands, i.e., the first frequency band and the second frequency band, it becomes possible to commonly use the spirally wound conductive object 2 as an antenna conductor.

As a result, similar to the above-mentioned first through fourth embodiments, the coil conductor for the LF band or for the HF band can be made use of as a UHF band antenna conductor, so it is possible to obtain a radio communication device according to an RFID card type tag, which can ensure the mounting area of each antenna as large as possible, and which is sharable with an LF band or an HF band and a UHF band, while having a communication range equivalent to the communication range of each of the LF band or the HF band and the UHF band.

Here, note that the interwinding-wire capacitive coupling unit 18 is not limited to the configuration of FIG. 29 and FIG. 30. For example, as the conductive object 19, there can be selected an arbitrary shape such as a rectangle shape, a circular shape, an elliptical shape, etc. In addition, as shown in a plan view of FIG. 33, a configuration may also be adopted in which not only the conductive object 19 but also the integrated circuit 4 is arranged on the back surface of the plate-like object 1, with one terminal end of the integrated circuit 4 being connected to the conductive object 19.

Further, if a desired interwinding-wire capacitive coupling can be obtained, there is necessarily no need to partially change or deform the winding wire shape of the spirally wound conductive object 2.

Figure 33:
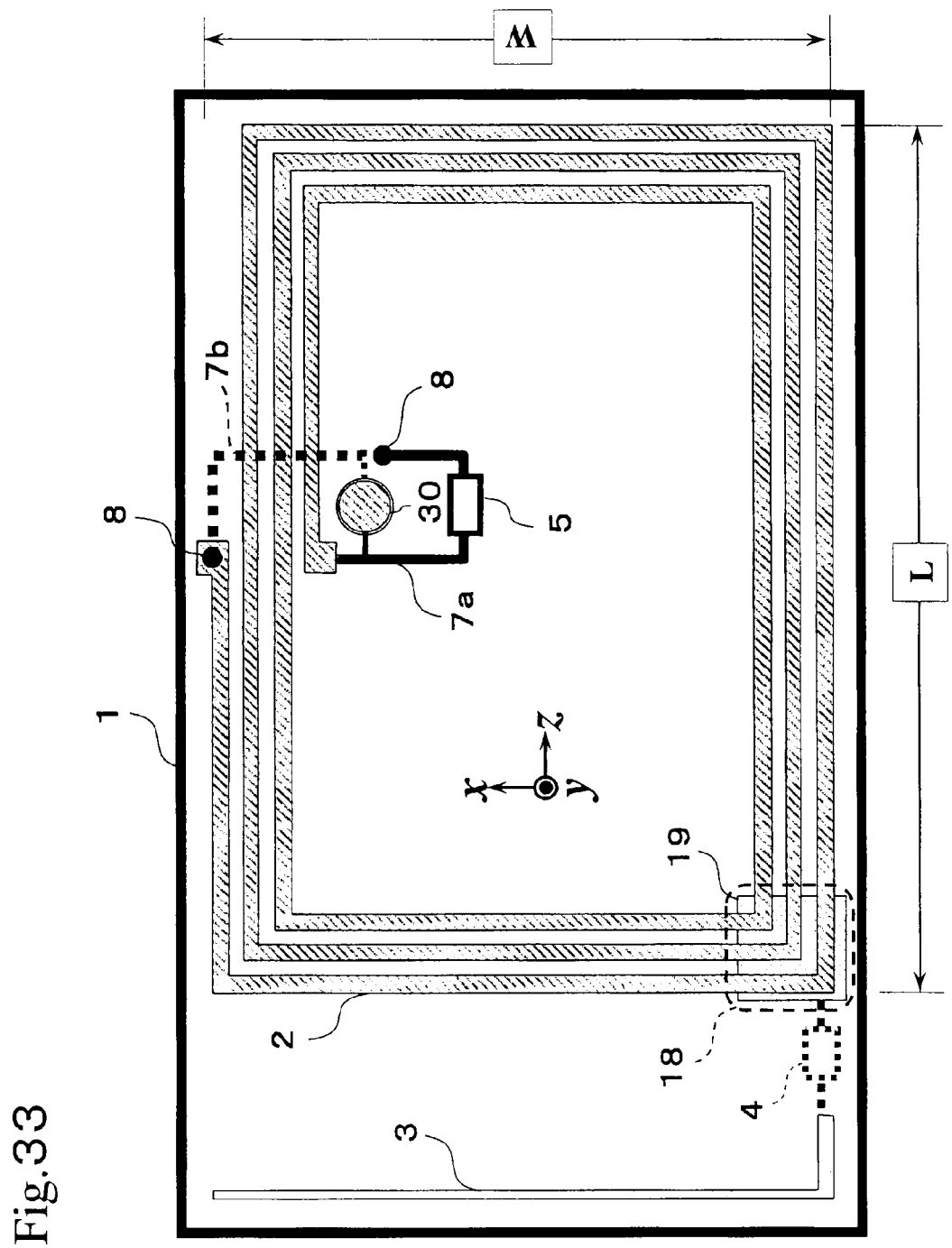
[FIG. 33] is a plan view showing another configuration example of the radio communication device according to the fifth embodiment of this invention. (Fifth Embodiment)

In FIG. 33, the radio communication device is provided with the integrated circuit 4 that has a communication function in the first frequency band, the conductive object 3 that is connected to one of the input and output terminals of the integrated circuit 4, the integrated circuit 5 that has a communication function in the second frequency band, the spirally wound conductive object 2 that is connected between the input and output terminals of the integrated circuit 5, and the conductive object 19 (third conductive object), wherein the conductive object 19 is arranged in a manner separated the predetermined interval from, and overlapped with, parts of the spirally wound conductive object 2. Also, the other of the input and output terminals of the integrated circuit 4 is connected to the spirally wound conductive object 19.

In the antenna configuration of FIG. 33, too, the same operational effects as those mentioned above are achieved.

(Sixth Embodiment)

Figure 34:
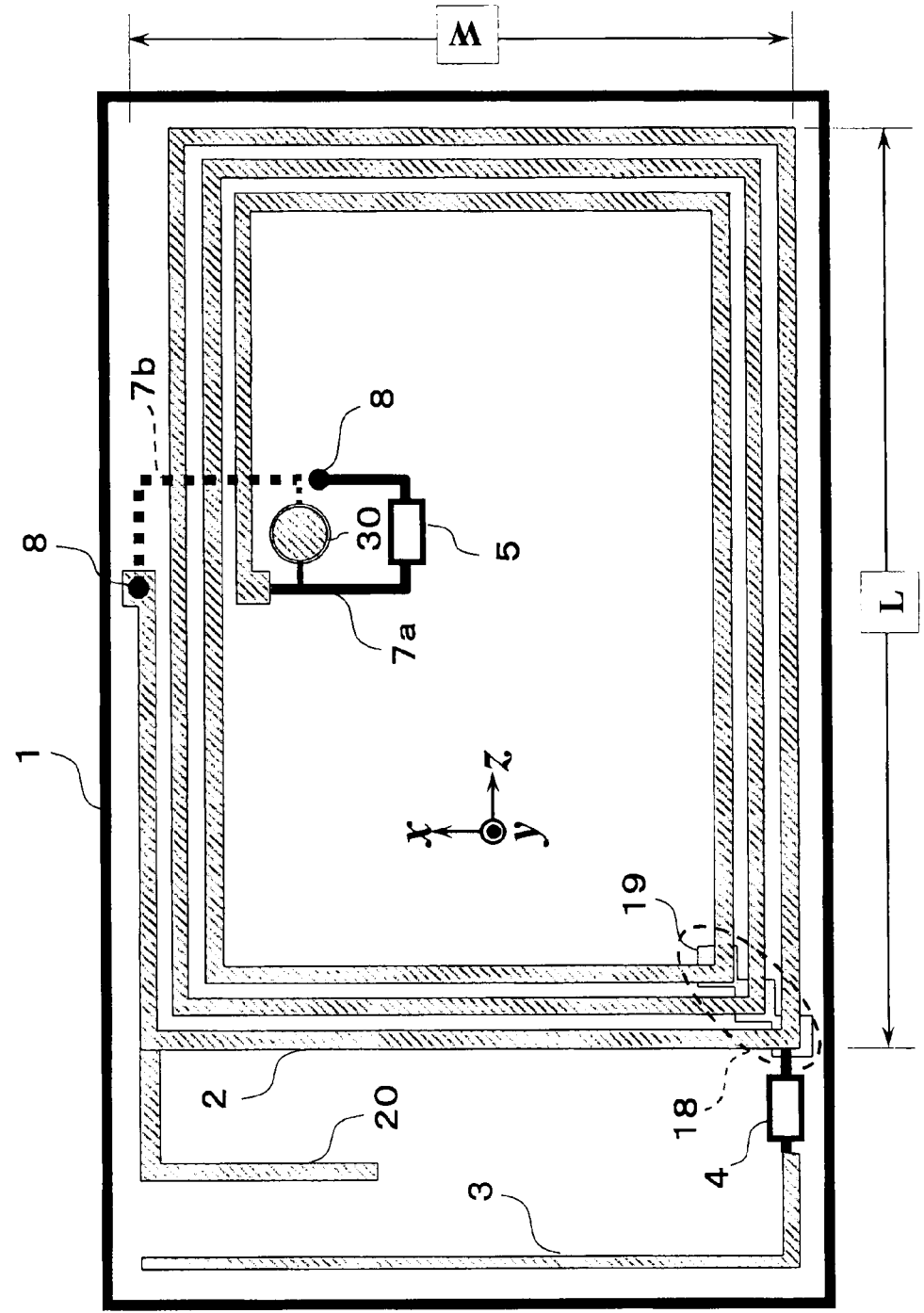
[FIG. 34] is a plan view showing a radio communication device according to a sixth embodiment of this invention. (Sixth Embodiment)

Although in the above-mentioned first through fifth embodiments, only the conductive object 3 is arranged for the spirally wound conductive object 2, further provision may be made for a conductive object 20 that is connected to the spirally wound conductive object 2, as shown in FIG. 34.

FIG. 34 is a plan view showing a radio communication device according to a sixth embodiment of this invention, wherein there is shown, for example, a case where the conductive object 20 is added to the configuration of the above-mentioned fifth embodiment (FIG. 29).

In FIG. 34, the conductive object 20 of an L shape is provided as an antenna main component conductor, in addition to the above-mentioned spirally wound conductive object 2 and the conductive object 3, and the conductive object 20 has its one end connected to the spirally wound conductive object 2.

According to the antenna configuration of FIG. 34, in the first frequency band, it is possible to generate a plurality of resonance modes which comprises a resonance mode that is determined by the shapes of the conductive object 3 and the spirally wound conductive object 2, a resonance mode that is determined by the shape of the conductive object 20 and the spirally wound conductive object 2, and a resonance mode that is determined by the shape of the conductive objects 3, 20 and the spirally wound conductive object 2 (three conductive objects).

Accordingly, by optimizing the shapes of the individual conductive objects 3, 20 and the spirally wound conductive object 2, it is possible to achieve not only the above-mentioned operational effects but also wider bandwidth or multi-frequency sharing in the first frequency band, as a result of which it becomes possible to improve practicality and usefulness.

Figure 35:
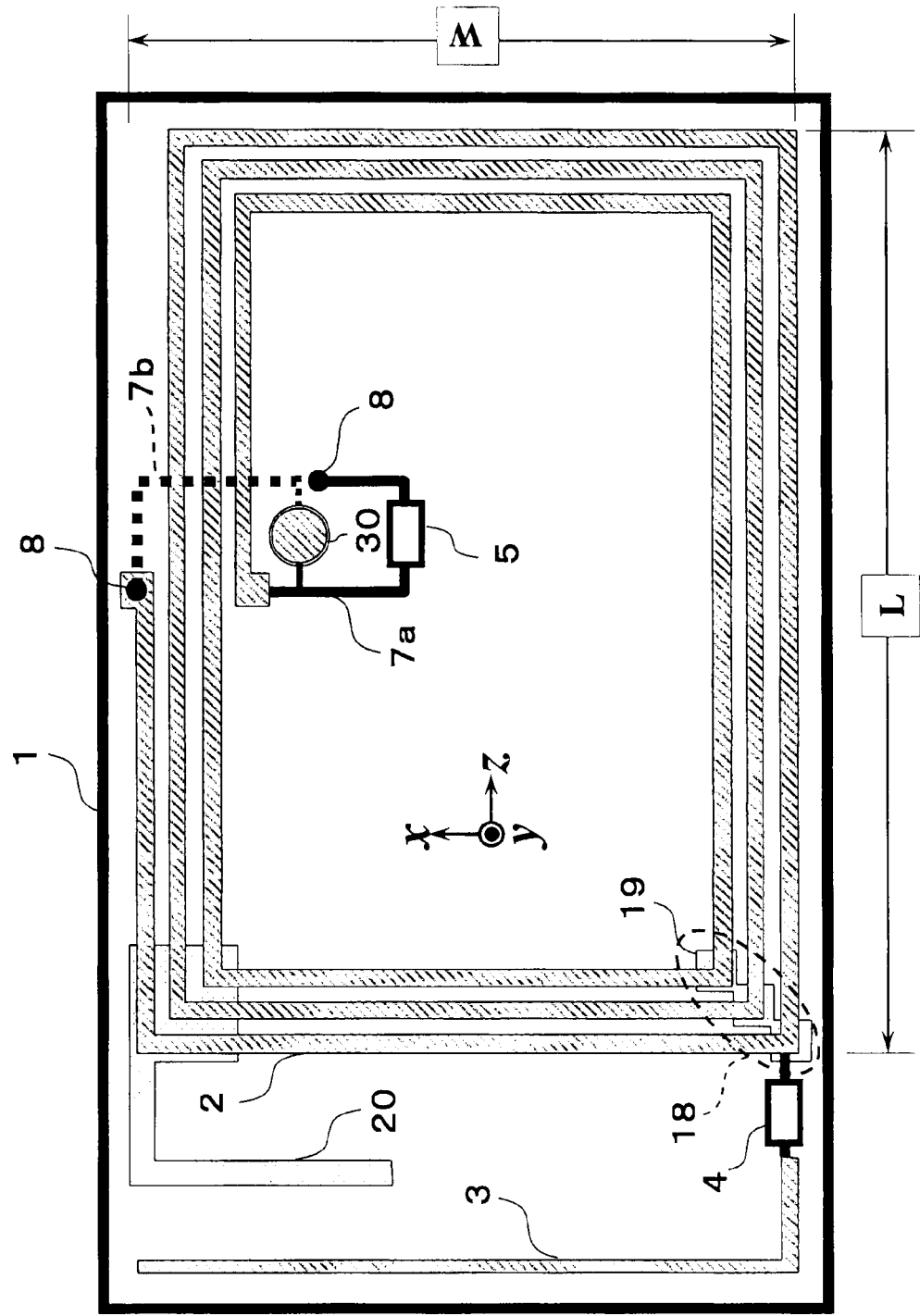
[FIG. 35] is a plan view showing another configuration example of the radio communication device according to the sixth embodiment of this invention. (Sixth Embodiment)

In addition, the conductive object 20 need not necessarily be connected to the spirally wound conductive object 2, but for example, as shown in a plan view of FIG. 35, the conductive object 20 may be formed on the back surface of the plate-like object 1. In this case, one end of the conductive object 20 is arranged in a manner separated a predetermined interval from, and overlapped with, a part of the spirally wound conductive object 2, so that it is capacitively coupled to the spirally wound conductive object 2. In the configuration of FIG. 35, too, the same operational effects as those mentioned above are achieved.

As described above, the radio communication device according to the sixth embodiment of the present invention is further provided with the conductive object 20 (fifth conductive object), as shown in FIG. 34, and one end of the conductive object 20 is connected to a part of the spirally wound conductive object 2.

In addition, one end of the conductive object 20 is arranged in a manner separated the predetermined interval from, and overlapped with, a part of the spirally wound conductive object 2, as shown in FIG. 35.

According to this, by generating the plurality of resonance modes, and at the same time, optimizing the shapes of the individual conductive objects 3, 20 and the spirally wound conductive object 2, it is possible to achieve, in addition to the above-mentioned operational effects, wider bandwidth or multi-frequency sharing in the first frequency band, as a result of which it becomes possible to improve practicality and usefulness.

(Seventh Embodiment)

Referring to the antenna configuration of FIG. 10 in the above-mentioned first embodiment, in cases where in the second frequency band, a magnetic field is generated which passes through the interior of a closed circuit which is formed of the integrated circuit 4 and the conductive object 11, a part of electric power in the second frequency band is consumed by the resistance component of the integrated circuit 4 used for communication in the first frequency band, so there may be caused a problem that the communication range in the second frequency band reduces.

Figure 36:
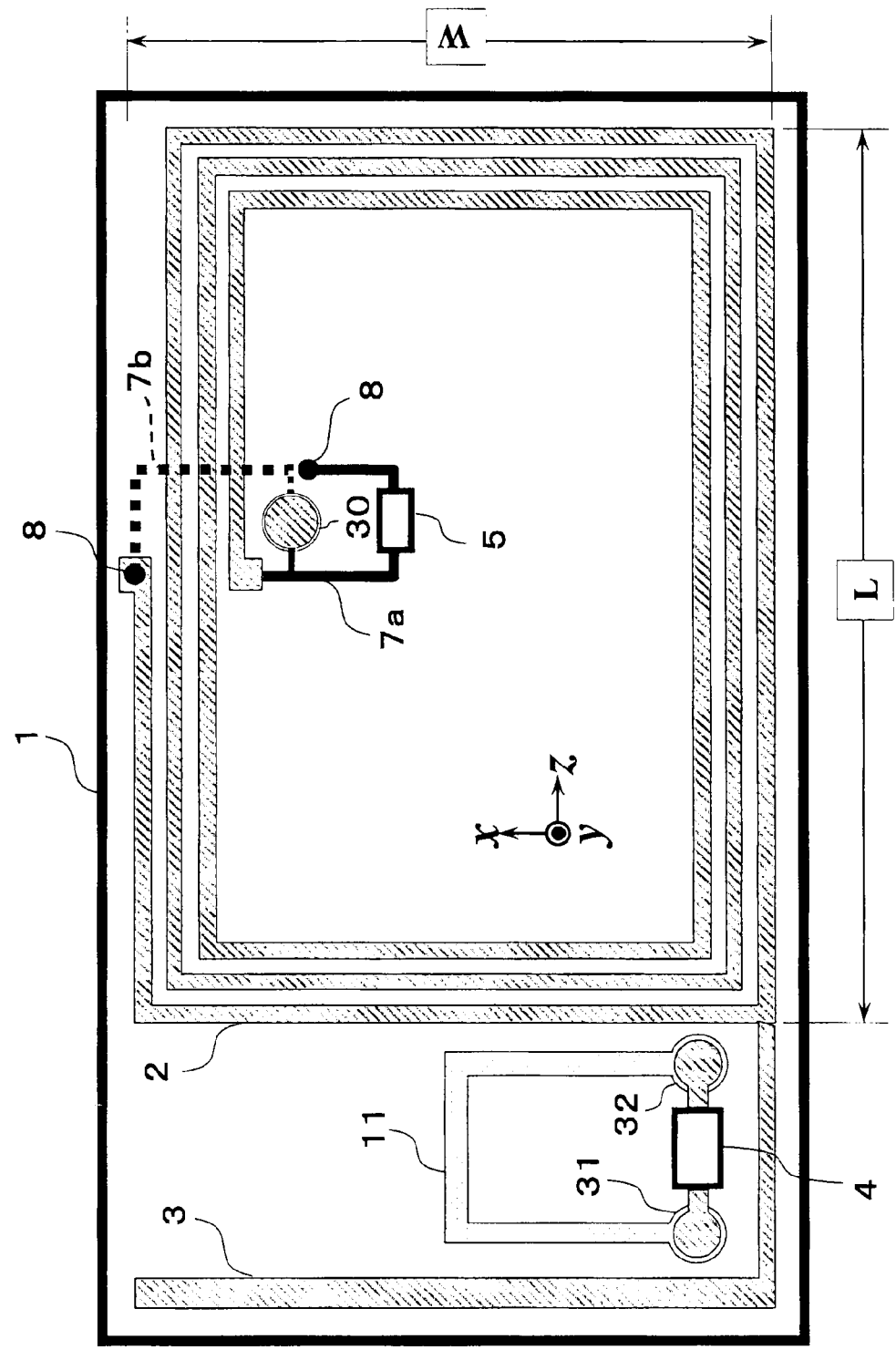
[FIG. 36] is a plan view showing a radio communication device according to a seventh embodiment of this invention. (Seventh Embodiment)

Accordingly, in order to avoid this problem, it is desirable to insert parallel plate capacitors 31, 32 electrically in series between the input and output terminals of the integrated circuit 4 and the conductive object 11, as shown in a plan view of FIG. 36.

In the antenna configuration of FIG. 36, by selecting the electrostatic capacitances of the parallel plate capacitors 31, 32 to suitable values, respectively, it is possible to avoid power dissipation in the second frequency band due to the integrated circuit 4 without having an adverse effect on the communication performance in the first frequency band, and hence it becomes possible to keep communication performance in the second frequency band in a good condition.

In addition, even in cases where there is no adverse effect onto the communication performance in the second frequency band, by inserting the parallel plate capacitors 31, 32 electrically in series between the input and output terminals of the integrated circuit 4 and the conductive object 11, it is possible to use the parallel plate capacitors 31, 32 as an impedance matching circuit for the first frequency band, as a consequence of which there can be achieved an effect of increasing the degree of freedom of designing in the first frequency band.

As described above, in the radio communication device according to the seventh embodiment of this invention, as shown in FIG. 36, chip capacitors, parallel plate capacitors, or interdigital capacitors are inserted in series between the input and output terminals of the integrated circuit 4 and a conductive object (any one of the spirally wound conductive object 2 and the conductive objects 3, 11, 19) connected to the input and output terminals, and capacitive reactances (parallel plate capacitors 31, 32) are inserted electrically in series with respect to the input and output terminals of the integrated circuit 4.

As a result of this, the power dissipation in the second frequency band in the integrated circuit 4 can be avoided, thus making it possible to solve the problem of the reduction in communication range.

In addition, the capacitive reactances (frequency selective coupling unit) can be used as the impedance matching circuit for the first frequency band, so the degree of freedom of designing in the first frequency band can be increased.

As a result, it becomes possible to improve the communication performance of the radio communication devices described in the above-mentioned first through sixth embodiments.

Here, note that in FIG. 36, the parallel plate capacitors 31, 32 are shown as an example of the capacitive reactances inserted electrically in series between the integrated circuit 4 and the conductive object 11, but such capacitive reactances are not limited to these, and if the same operational effect as in the parallel plate capacitors 31, 32 can be obtained, an arbitrary configuration such as chip capacitors, interdigital capacitors, or the like can be applied. Also, the above-mentioned resonators (dielectric resonators, ceramic resonators, piezoelectric resonators, etc.) may be used.

Moreover, in FIG. 36, the case where the present invention is applied to the above-mentioned antenna configuration of FIG. 10 is shown, but in other arbitrary antenna configurations, too, the same operational effect can be achieved by inserting capacitive reactances between the input and output terminals of the integrated circuit 4.

(Eighth Embodiment)

Although not specifically referred to in the above-mentioned first through seventh embodiments, by combining the first through seventh embodiments, it is possible to design an RFID tag of card type which is capable of performing good communication in both of the first and second frequency bands.

In the following, reference will be made to a radio communication device according to an eighth embodiment of the present invention which combines the first through seventh embodiments, while referring to FIG. 37 through FIG. 42.

Here, it is assumed that the center frequency in the first frequency band is 953 MHz, and the center frequency in the second frequency band is 13.56 MHz.

Figure 37:
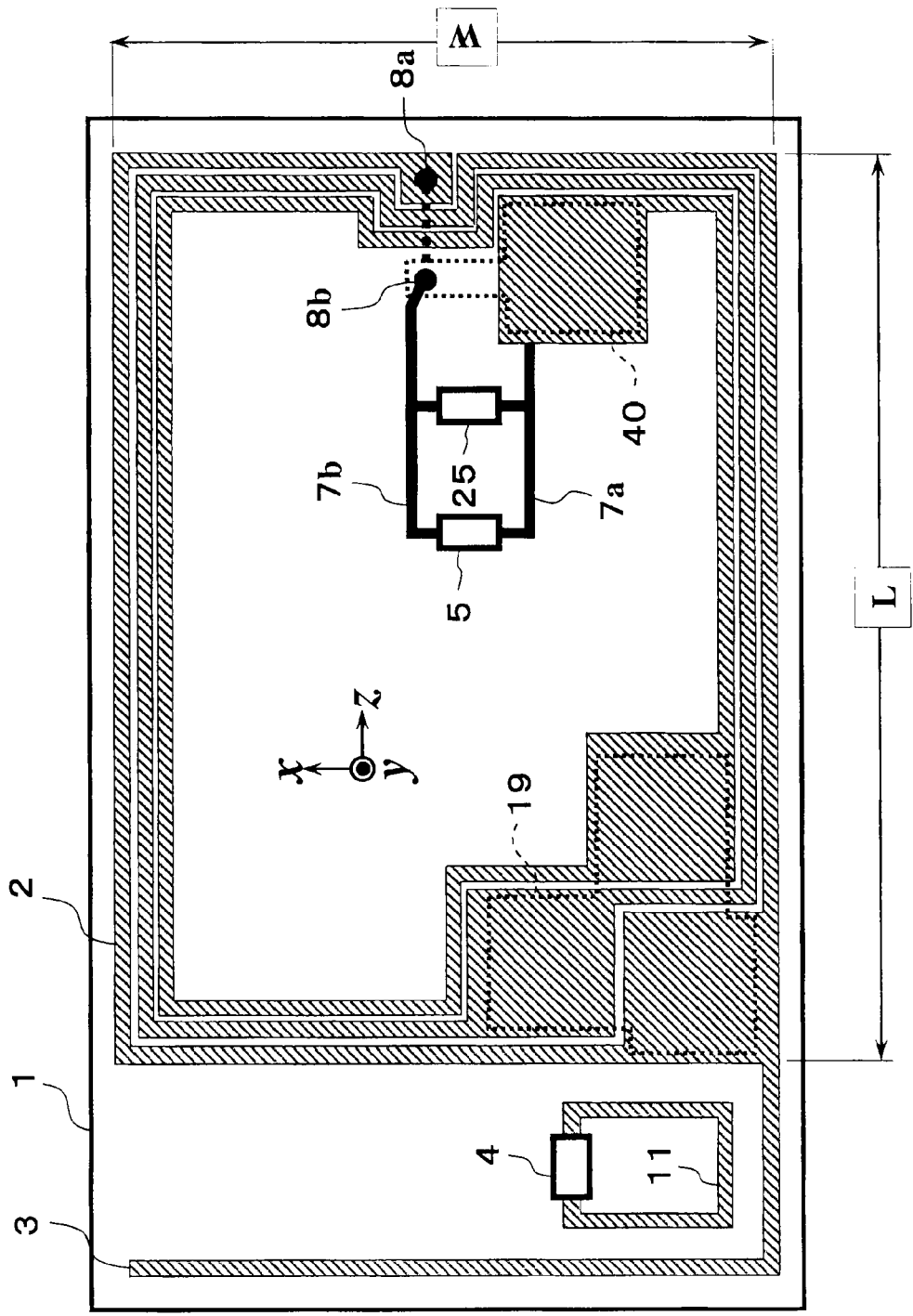
[FIG. 37] is a plan view showing a radio communication device according to an eighth embodiment of this invention, wherein the front surface configuration of a designed tag is illustrated. (Eighth Embodiment)
Figure 38:
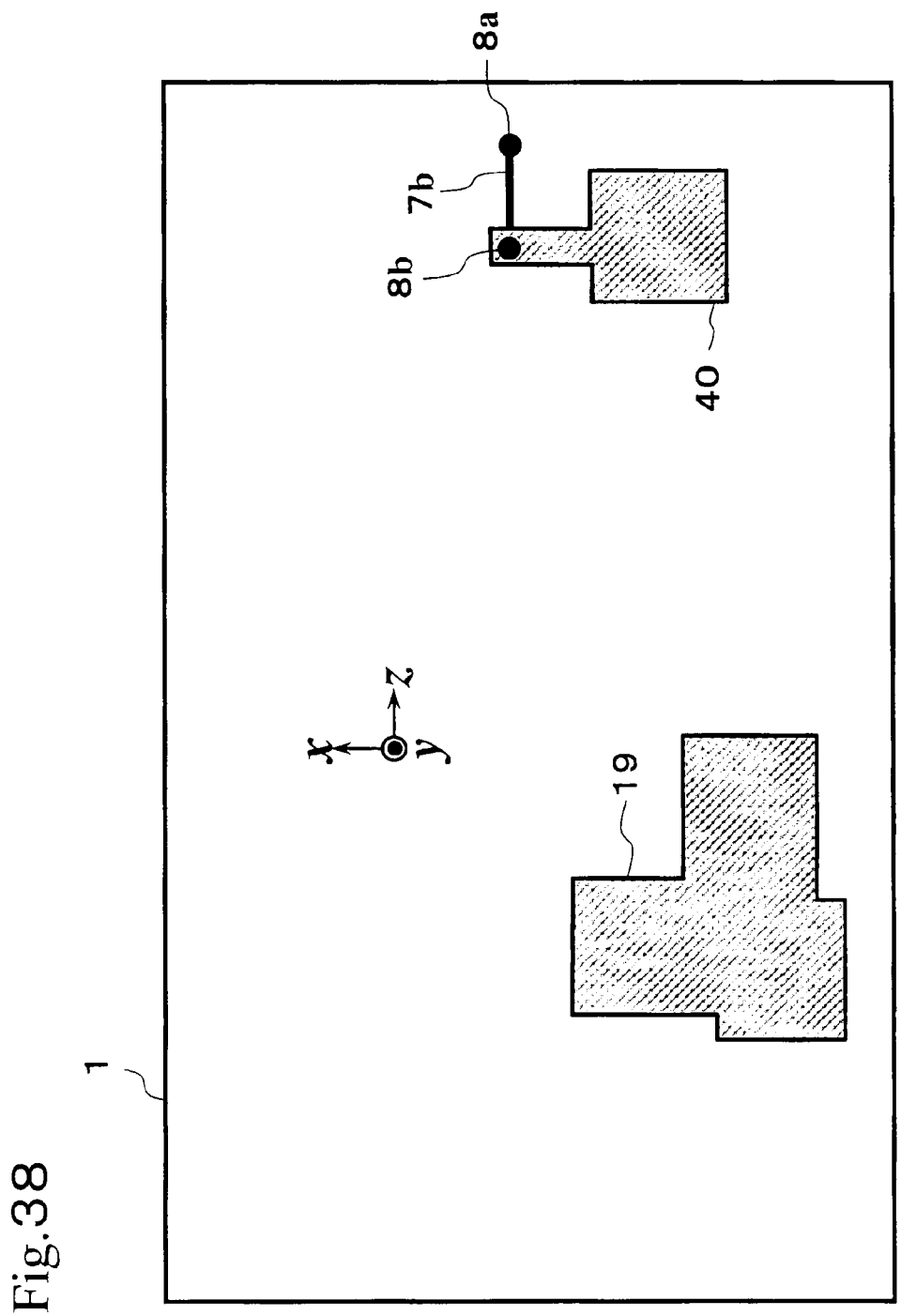
[FIG. 38] is a plan view of the back surface configuration of the tag shown in FIG. 37, as seen through from a front surface side thereof. (Eighth Embodiment)

FIG. 37 is a plan view showing a radio communication device according to the eighth embodiment of this invention, wherein the front surface configuration of a designed tag is illustrated. Also, FIG. 38 is a plan view of the back surface configuration of the tag designed as shown in FIG. 37, as seen through from a front surface side thereof.

In FIG. 37, the radio communication device is provided with a plate-like object 1, a spirally wound conductive object 2 which has outside dimensions L, W, a conductive object 3 of an L shape (an extended shape), integrated circuits 4, 5, conductive objects 7a, 7b, different interlayer connection parts 8a, 8b such as through holes, a closed loop-like conductive object 11, a chip capacitor (hereinafter, referred to simply as a "capacitor") 25, and conductive objects 19, 40.

The capacitor 25 corresponds in function to the above-mentioned circuit elements 15 (FIG. 18), and the conductive object 40 corresponds in function to the above-mentioned conductive object 20 (FIG. 34, FIG. 35).

The capacitor 25 corresponds in function to the above-mentioned parallel plate capacitor 30 (FIG. 18). Also, the conductive object 40, together with parts of the spirally wound conductive object 2 arranged in opposition thereto, forms a parallel plate capacitor, and hence corresponds in function to the above-mentioned parallel plate capacitor 30 (FIG. 18).

The conductive object 19, together with parts of the spirally wound conductive object 2 arranged in opposition thereto, forms a parallel plate capacitor, and corresponds in function to the above-mentioned circuit elements 15 (FIG. 18).

The spirally wound conductive object 2, the conductive object 3, the conductive object 7a, and the conductive object 11 are arranged on the front surface of the plate-like object 1. On the other hand, the conductive objects 19, 40 are arranged on the back surface of the plate-like object 1. Moreover, the conductive objects 7b are formed on the front surface and the back surface of the plate-like object 1 through the different layer connection part 8.

The outside dimensions of the plate-like object 1 correspond to the card size standard currently used, and the length thereof in the z direction in FIG. 37 is set to be 85.4 mm, and the length thereof in the x direction is set to be 54 mm.

In addition, the outside dimensions L, W of the spirally wound conductive object 2 are set to be L=64 mm and W=46 mm, in comprehensive consideration of the manufacturability and the antenna performance in both of the first and second frequency bands, in addition to the above-mentioned card size standard. Moreover, the number of turns of the spirally wound conductive object 2 is set to "3".

The plate-like object 1 is formed of a dielectric film substrate.

One integrated circuit 4 of the integrated circuits 4, 5 is provided with a characteristic and a function which can perform good communication with external communication equipment (reader/writer) in the frequency range of 860 MHz to 960 MHz.

In addition, the other integrated circuit 5 is provided with a characteristic and a function which can perform good communication with the external communication equipment in a band of 13.56 MHz.

The conductive objects 7a, 7b serve to connect the spirally wound conductive object 2 and the input and output terminals of the integrated circuit 5 with each other.

The different layer connection part 8a serves to connect between the spirally wound conductive object 2 and the back conductive object 7b, and the different layer connection part 8b serves to connect the front and back conductive objects 7b with each other, and at the same time connect the front conductive object 7b and the conductive object 40 with each other. The opposite ends of the conductive object 11 are connected to the input and output terminals of the integrated circuit 4.

In addition, as shown in the above-mentioned fifth embodiment (FIG. 29), in the vicinity of a connection portion between the conductive object 3 and the spirally wound conductive object 2, the widths of the winding wires of the spirally wound conductive object 2 are made partially larger in those parts so as to capacitively couple adjacent winding wires of the spirally wound conductive object 2, and at the same time, the conductive object 19 is arranged on the opposing parts of the rear surface of the plate-like object 1, thereby forming a parallel plate capacitor.

Similarly, in the right of the spirally wound conductive object 2, too, a parallel plate capacitor is formed by the use of the conductive object 40, and this corresponds to the parallel plate capacitor 30 in the above-mentioned first through seventh embodiments.

The dynamic impedance of the integrated circuit 4 is 20-j190 [$\Omega$].

As a method of taking impedance matching of the integrated circuit 4 and the antenna, there is employed an electromagnetic coupling power supply system using a minute loop, as described in the above-mentioned first embodiment.

The input impedance of the antenna, i.e., the impedance when viewing the antenna side from the terminals of the integrated circuit 4 is designed to be a desired impedance, i.e., the complex conjugate value of the dynamic impedance value of the integrated circuit 4, by adjusting the shape, dimensions and position of the closed loop-like conductive object 11, and the length of the conductive object 3.

In the eighth embodiment (FIG. 37) of the present invention, between the terminals of the integrated circuit 5, there is also connected the capacitor 25, in addition to the parallel plate capacitor which is formed of the spirally wound conductive object 2 and the conductive object 40.

The above-mentioned configuration is intended to execute designing of an antenna in the UHF band and designing of an antenna in the HF band in a substantially independent manner.

That is, the electrostatic capacitance value of the parallel plate capacitor, which is formed of the spirally wound conductive object 2 and the conductive object 40, is designed in such a manner that the antenna characteristic in the UHF band becomes good. Also, the electrostatic capacitance value of the capacitor 25 is designed in such a manner that the antenna characteristic in the HF band becomes good.

Figure 39:
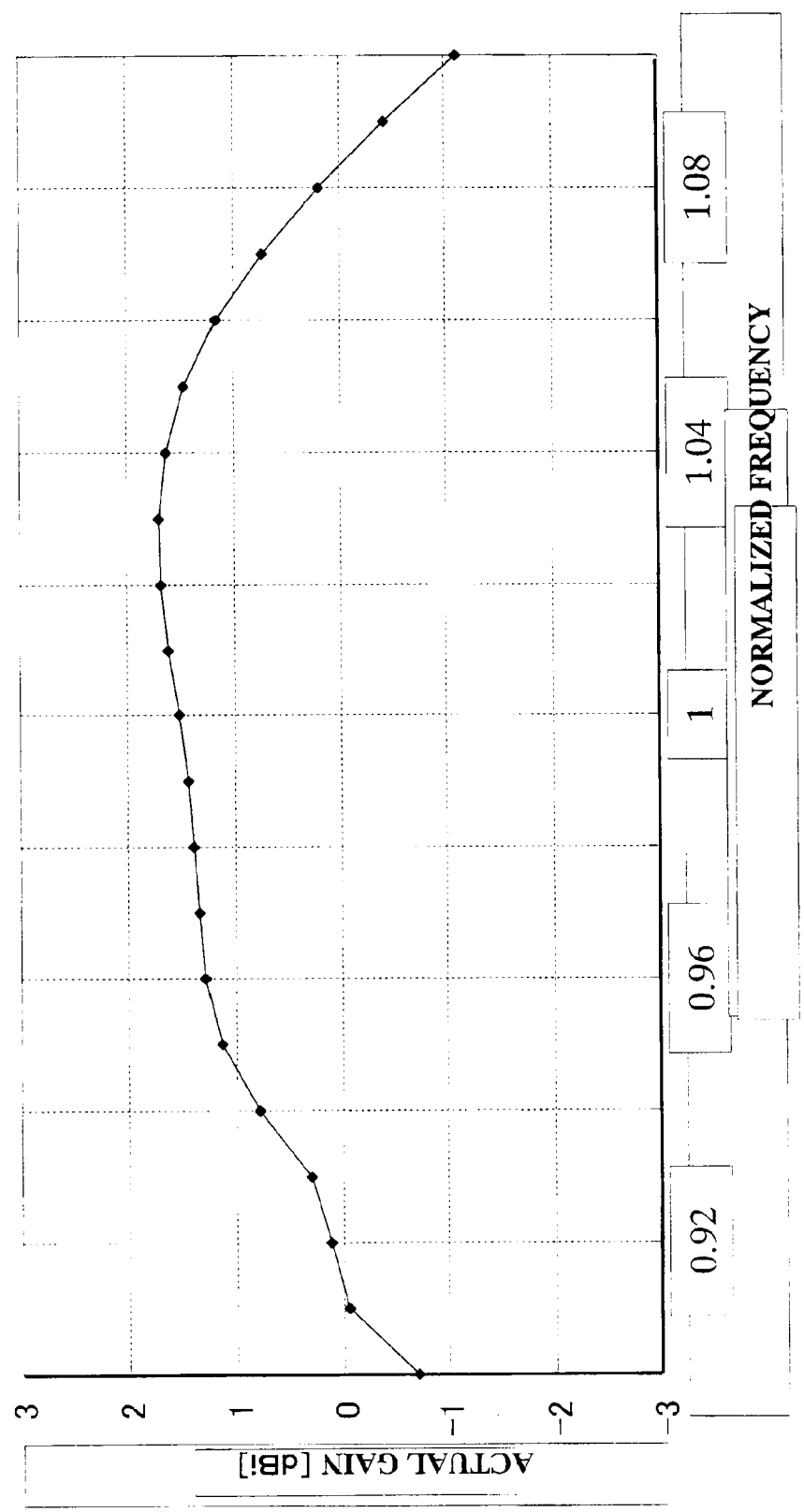
[FIG. 39] is an explanatory view showing the result of designing for the circuit configuration of FIG. 37 and FIG. 38. (Eighth Embodiment)

FIG. 39 is an explanatory view showing the result of designing for the circuit configuration of FIG. 37 and FIG. 38, wherein the frequency characteristic of the actual gain of a UHF band antenna is shown.

In FIG. 39, the axis of abscissa is the frequency normalized by 960 MHz, and the axis of ordinate is the actual gain [dBi].

The actual gain represented on the axis of ordinate is defined by a value which is obtained by subtracting a radiation efficiency (a loss due to antenna components such as a conductor loss, a dielectric loss and so on) and a mismatch loss (a loss due to impedance mismatch between the antenna and the integrated circuit 4) from a directional gain which is determined only by a radiation pattern. In addition, the gain is evaluated by the value thereof in the y direction (the normal line direction of the plate-like object 1) as shown in FIG. 37.

As is clear from FIG. 39, a fractional bandwidth in which the actual gain is 1 dBi or more is about 11% (0.95 to 1.06), and a fractional bandwidth in which the actual gain is 0 dBi or more is about 16% (0.92 to 1.08), so it can be seen that high actual gains are obtained over a wide band.

As a result of having carried out pilot product evaluation based on the result of designing according to the eighth embodiment of the present invention, a communication range of 6.2 m was obtained in the UHF band, and it was verified that the circuit configuration of the eighth embodiment has sufficient performance for practical use.

Figure 40:
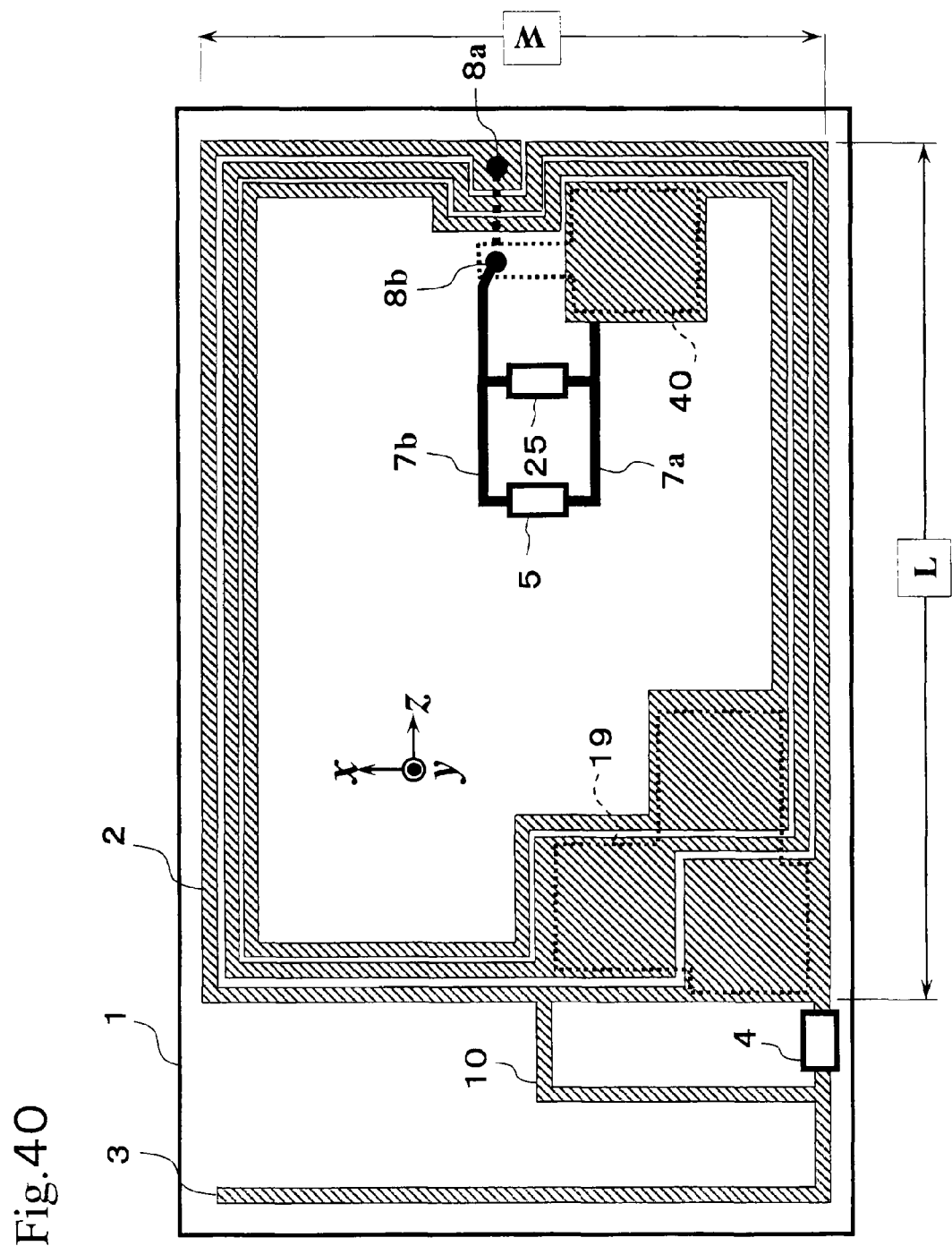
[FIG. 40] is a plan view showing another configuration example of the radio communication device according to the eighth embodiment of this invention, wherein the case where a short stub is used in place of a closed-loop shaped conductive object in FIG. 37 is illustrated. (Eighth Embodiment)

Here, note that in general, a wide band characteristic is obtained by means of the electromagnetic coupling power supply system using the minute loop (the closed loop-like conductive object 11) as shown in FIG. 37, but in cases where this electric power supply system is difficult to achieve, impedance matching with the integrated circuit 4 may be taken by the use of a short stub 10 in place of the closed loop-like conductive object 11, as shown in FIG. 40.

Figure 41:
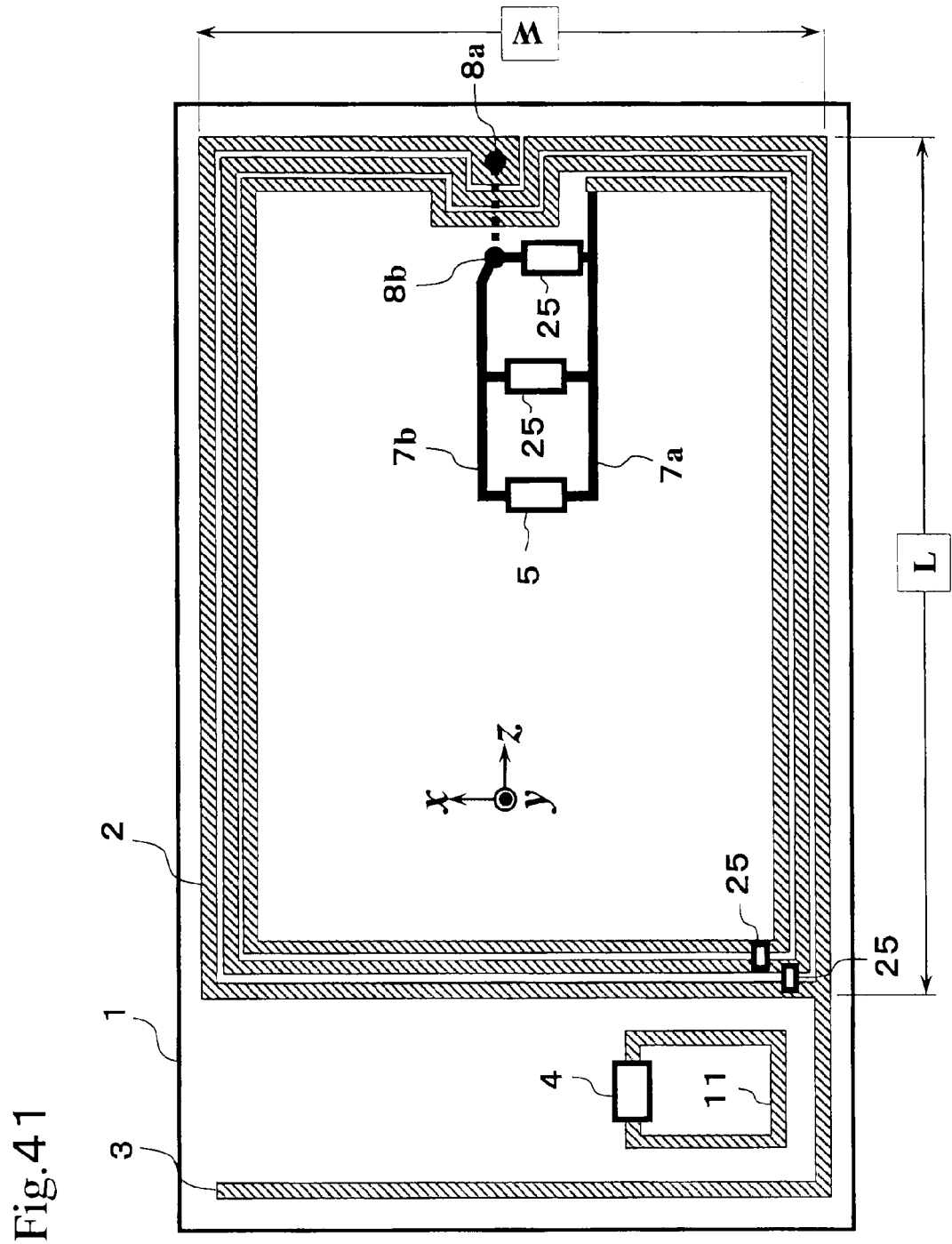
[FIG. 41] is a plan view showing another configuration example of the radio communication device according to the eighth embodiment of this invention, wherein the case where a chip capacitor is used in place of the conductive object in FIG. 37 is illustrated. (Eighth Embodiment)
Figure 42:
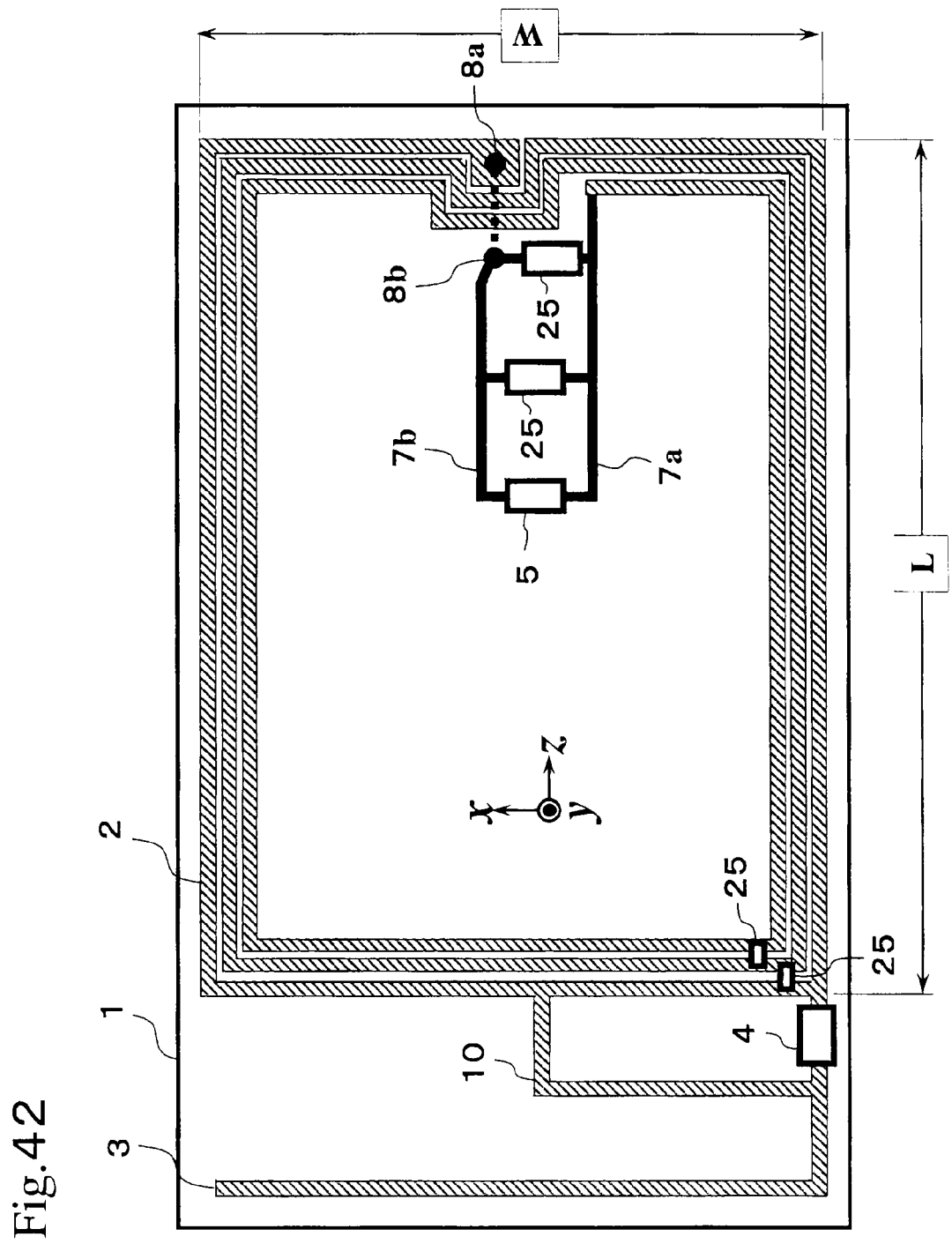
[FIG. 42] is a plan view showing another configuration example of the radio communication device according to the eighth embodiment of this invention, wherein the case where a chip capacitor is used in place of a conductive object in FIG. 40 is illustrated. (Eighth Embodiment)

In addition, the parallel plate capacitor (the conductive object 40) is used in FIG. 37 and FIG. 40, but in cases where a chip capacitor can be easily mounted, it is also possible to use a capacitor 25 instead of the parallel plate capacitor (the conductive object 40), as shown in FIG. 41 and FIG. 42.

On the contrary, in cases where mounting of capacitor components such as the chip capacitor is difficult, the capacitor 25 may be replaced by a parallel plate capacitor (the conductive object 40).

Moreover, in order to put the radio communication devices described in the above-mentioned first through eighth embodiments into forms of practical use, polypropylene (PP), polyethylene terephthalate (PET), polyimide (PI), or the like may be used, for example, as the plate-like object 1.

Further, although the various conductive objects 2, 2a, 2b, 2c, 3, 10, 11, 19 and 40 are formed on the front surface or the back surface of the plate-like object 1, they can be formed, for example, by means of etching. In addition, they can be formed by causing a liquid containing metal particles to adhere to the plate-like object 1 while applying a printing technique such as ink jet printing, silk screen printing, or the like.

Furthermore, the plate-like object 1 and the various conductive objects 2, 2a, 2b, 2c, 3, 10, 11, 19 and 40 may be formed by means of etching processing while using an arbitrary double-sided substrate as the plate-like object 1.

In addition, the different layer connection parts 8 can be formed by the use of a through hole processing technology, etc., and the integrated circuits 4, 5 and the circuit element (the capacitor 25) can be electrically coupled with various kinds of conductive objects by the use of soldering, electrically conductive adhesives, or ultrasonic waves.

Moreover, particularly needless to illustrate, by covering the surfaces of electric/electronic circuits which are shown in the above-mentioned first through eighth embodiments (e.g., the front surface or the back surface of the plate-like object 1 on which the various kinds of conductive objects are formed) with a coating resin or the like, it is possible to achieve a more practically usable antenna configuration. In this case, as such a coating resin, it is preferable to use a material on which printing/typing can be made, or a material from which a label, if attached thereto, does not easily peel off.

Further, the radio communication devices according to the first through eighth embodiments can be applied to radio communications with a credit function or an authentication function.

In addition, by including the first frequency band in the UHF band (300 MHz to 3,000 MHz), and the second frequency band in the LF band (30 kHz to 300 kHz) or in the HF band (3 MHz to 30 MHz), it is possible to obtain a radio communication device according to an RFID card type tag, which can ensure the mounting area of each antenna as large as possible, and which is sharable with the LF band or the HF band and the UHF band, while having a communication range equivalent to the communication range of each single unit.

[Explanation Of Reference Numerals And Characters]

1 a plate-like object, 1, 2 spirally wound conductive objects, 3, 7a, 7b, 10, 11, 19, 20, 40 conductive objects, 4, 5 integrated circuits, 8 different interlayer connection parts, 15 circuit elements, 25 a chip capacitor, 30a, 30b plates, and 30 a parallel plate capacitor.

The invention claimed is:

1. A radio communication device composed of an antenna which performs communication corresponding to individual signals in at least two high and low frequency bands including a first frequency band and a second frequency band sufficiently low as compared with said first frequency band, said device comprising:

a first integrated circuit with a communication function in said first frequency band;

a first conductive object connected to one of input and output terminals of said first integrated circuit;

a second integrated circuit with a communication function in said second frequency band; and a second conductive object connected between input and output terminals of said second integrated circuit;

wherein said second conductive object is composed of a spirally wound conductive object; and the other of the input and output terminals of said first integrated circuit is connected to a part of said spirally wound conductive object.

2. The radio communication device as set forth in claim 1, further comprising:
a third conductive object;
wherein said third conductive object has one end connected to said first conductive object; and
said third conductive object has the other end connected to said spirally wound conductive object.

3. A radio communication device composed of an antenna which performs communication corresponding to individual signals in at least two high and low frequency bands including a first frequency band and a second frequency band sufficiently low as compared with said first frequency band, said device comprising:
a first integrated circuit with a communication function in said first frequency band;
a first conductive object;
a second integrated circuit with a communication function in said second frequency band;
a second conductive object connected between input and output terminals of said second integrated circuit; and
a third conductive object of a closed loop shape connected between input and output terminals of said first integrated circuit;
wherein
said second conductive object is composed of a spirally wound conductive object;
said first conductive object has one end connected to a part of said spirally wound conductive object; and
said third conductive object is arranged in the vicinity of at least one of said first conductive object and said spirally wound conductive object.

4. The radio communication device as set forth in claim 3, wherein said second integrated circuit and said third conductive object are arranged at an outer side of said spirally wound conductive object.

5. The radio communication device as set forth in claim 3, wherein said second integrated circuit and said third conductive object are arranged at an inner side of said spirally wound conductive object.

6. The radio communication device as set forth in claim 3, comprising: a fourth conductive object arranged in a manner separated a predetermined interval from, and overlapped with, a part of said spirally wound conductive object.

7. A radio communication device composed of an antenna which performs communication corresponding to individual signals in at least two high and low frequency bands including a first frequency band and a second frequency band sufficiently low as compared with said first frequency band, said device comprising:
a first integrated circuit with a communication function in said first frequency band;
a first conductive object connected to one of input and output terminals of said first integrated circuit;
a second integrated circuit with a communication function in said second frequency band;
a second conductive object connected between input and output terminals of said second integrated circuit; and
a third conductive object;
wherein
said second conductive object is composed of a spirally wound conductive object;
said third conductive object is arranged in a manner separated a predetermined interval from, and overlapped with, a part of said spirally wound conductive object; and
the other of the input and output terminals of said first integrated circuit is connected to said third conductive object.

8. The radio communication device as set forth in claim 7, further comprising: a frequency selective coupling unit arranged between adjacent winding wires of a part of said spirally wound conductive object.

9. The radio communication device as set forth in claim 8, wherein said frequency selective coupling unit is composed of a capacitor.

10. The radio communication device as set forth in claim 8, wherein said frequency selective coupling unit is composed by a resonator.

11. The radio communication device as set forth in claim 8, wherein said frequency selective coupling unit is constructed by forming the winding wire width of said spirally wound conductive object to be partially large.

12. The radio communication device as set forth in claim 8, wherein said frequency selective coupling unit is composed of an interdigital capacitor formed between said winding wires by partially changing the winding wire shape of said spirally wound conductive object.

13. The radio communication device as set forth in claim 7, further comprising:
a fifth conductive object;
wherein said fifth conductive object has one end connected to a part of said spirally wound conductive object.

14. The radio communication device as set forth in claim 7, further comprising:
a fifth conductive object;
wherein said fifth conductive object has one end arranged in a manner separated a predetermined interval from, and overlapped with, a part of said spirally wound conductive object.

15. The radio communication device as set forth in claim 7, wherein chip capacitors, parallel plate capacitors, or interdigital capacitors are inserted in series between the input and output terminals of said first integrated circuit and said third integrated circuit, respectively.

16. The radio communication device as set forth in claim 7, wherein a chip capacitor, a parallel plate capacitor, or an interdigital capacitor is inserted in parallel between the input and output terminals of said second integrated circuit.

17. The radio communication device as set forth in claim 7, further comprising:
a plate-like object;
wherein said first, second or third conductive object is formed on a front surface or a back surface of said plate-like object.

18. The radio communication device as set forth in claim 17, wherein the front surface and the back surface of said plate-like object, on which said first, second or third conductive object is formed, are covered with resin.

19. A radio communication device composed of an antenna which performs communication corresponding to individual signals in at least two high and low frequency bands including a first frequency band and a second frequency band which is sufficiently low as compared with said first frequency band, said device comprising:
a first integrated circuit with a communication function in said first frequency band;
a second integrated circuit with a communication function in said second frequency band;
a plate-like dielectric member;
a spirally wound conductive object formed on a front surface of said plate-like dielectric member;

a first conductive object formed on the front surface of said plate-like dielectric member, and said first conductive object having one end connected to said spirally wound conductive object;

a second conductive object of a closed loop shape formed on the front surface of said plate-like dielectric member, and said second conductive object having opposite ends connected to said first integrated circuit;

a third and a fourth conductive object formed on a back surface of said plate-like dielectric member;

a different interlayer connection structure connecting the conductive objects formed on the front surface of said plate-like dielectric member and the conductive objects formed on the back surface thereof to each other; and a capacitor;

wherein said first integrated circuit and said second conductive object are arranged between said first conductive object and said spirally wound conductive object;

the width of each of winding wires which form said spirally wound conductive object is partially enlarged in the vicinity of a connection part between said first conductive object and said spirally wound conductive object, and said third conductive object is arranged in a back surface part opposing to these;

a terminating end of said spirally wound conductive object is partially enlarged, and said fourth conductive object is arranged in a back surface part opposing to this;

the terminating end of said spirally wound conductive object is connected to one terminal of said second integrated circuit;

a starting end of said spirally wound conductive object is connected to the other terminal of said second integrated circuit and said fourth conductive object through said different interlayer connection structure; and said capacitor is connected between the terminals of said second integrated circuit.

20. The radio communication device as set forth in claim 19, wherein chip capacitors, parallel plate capacitors, or interdigital capacitors are inserted in series between the input and output terminals of said first integrated circuit and said second conductive object, respectively.

21. The radio communication device as set forth in claim 19, wherein the front surface and the back surface of said plate-like object, on which said first, second, third and fourth conductive object are formed, are covered with resin.

22. The radio communication device as set forth in claim 19, wherein said first frequency band is included in 300 MHz to 3,000 MHz; and said second frequency band is included in 30 kHz to 300 kHz, or in 3 MHz to 30 MHz.

* * * * *